(12) United States Patent
Jing et al.

(10) Patent No.: US 11,175,811 B2
(45) Date of Patent: *Nov. 16, 2021

(54) METHOD, APPARATUS, AND TERMINAL FOR PROCESSING NOTIFICATION INFORMATION

(71) Applicant: HUAWEI TECHNOLOGIES CO., LTD., Guangdong (CN)

(72) Inventors: Hao Jing, Shenzhen (CN); Dian Fu, Shenzhen (CN); Yahui Wang, Beijing (CN); Xiaojuan Li, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,507

(22) Filed: Sep. 5, 2019

(65) Prior Publication Data

US 2019/0391732 A1 Dec. 26, 2019

Related U.S. Application Data

(63) Continuation of application No. 15/541,444, filed as application No. PCT/CN2015/070072 on Jan. 4, 2015, now Pat. No. 10,437,442.

(51) Int. Cl.
*H04L 12/58* (2006.01)
*G06F 3/0484* (2013.01)
(Continued)

(52) U.S. Cl.
CPC ........ *G06F 3/04845* (2013.01); *G06F 3/0481* (2013.01); *H04M 19/04* (2013.01)

(58) Field of Classification Search
CPC ... G06F 3/04845; G06F 3/0481; H04M 19/04
(Continued)

(56) References Cited

U.S. PATENT DOCUMENTS

2004/0098462 A1 5/2004 Horvitz et al.
2005/0198589 A1 9/2005 Heikes et al.
(Continued)

FOREIGN PATENT DOCUMENTS

CN 102207813 A 10/2011
CN 102789364 A 11/2012
(Continued)

OTHER PUBLICATIONS

Jeff Benjamin, Split screen multitasking tweak 'ReachApp' gets an app selector in big update, Jan. 2, 2015, all pages. (Year: 2015).*
(Continued)

*Primary Examiner* — Hassan Mrabi
(74) *Attorney, Agent, or Firm* — Fish & Richardson P.C.

(57) ABSTRACT

Embodiments of the present invention relate to the field of terminal application technologies, and provide a method, an apparatus, and a terminal for processing notification information. Therefore, an efficient operation manner for processing notification information is provided, which can simplify operation steps and improve usability and controllability of a device. The method is: after a user display operation is detected, and a display instruction corresponding to the user display operation is triggered, determining a target application program corresponding to notification information; and when it is determined that a screen display status meets a condition, adjusting, according to a preset adjustment policy corresponding to the display instruction, a window corresponding to the target application program. The embodiments of the present invention are used to process notification information of an intelligent terminal device.

20 Claims, 12 Drawing Sheets

(51) Int. Cl.
*G06F 3/0481* (2013.01)
*H04M 19/04* (2006.01)

(58) Field of Classification Search
USPC .......................................................... 715/798
See application file for complete search history.

(56) References Cited

U.S. PATENT DOCUMENTS

| | | | |
|---|---|---|---|
| 2010/0070866 A1 | 3/2010 | Tung et al. | |
| 2012/0102437 A1* | 4/2012 | Worley | G06F 3/04842 715/863 |
| 2013/0115927 A1* | 5/2013 | Gruber | H04W 4/16 455/414.1 |
| 2014/0118272 A1* | 5/2014 | Gunn | G06F 1/3265 345/173 |
| 2014/0184471 A1* | 7/2014 | Martynov | G06F 1/1637 345/1.2 |
| 2014/0282085 A1* | 9/2014 | Hsu | H04L 51/24 715/752 |
| 2015/0007100 A1 | 1/2015 | Wang et al. | |
| 2015/0058760 A1* | 2/2015 | Puthenveettil | G06F 3/04883 715/762 |
| 2016/0028875 A1* | 1/2016 | Brown | H04M 1/72547 715/751 |
| 2016/0188197 A1* | 6/2016 | Ryu | G06F 1/1626 345/156 |

FOREIGN PATENT DOCUMENTS

| | | |
|---|---|---|
| CN | 103019609 A | 4/2013 |
| CN | 103019681 A | 4/2013 |
| CN | 103279303 A | 9/2013 |
| CN | 103425453 A | 12/2013 |
| CN | 103488418 A | 1/2014 |
| CN | 103560942 A | 2/2014 |
| CN | 103593623 A | 2/2014 |
| CN | 103677521 A | 3/2014 |
| CN | 103716453 A | 4/2014 |
| CN | 103885711 A | 6/2014 |
| CN | 104049847 A | 9/2014 |
| CN | 104090720 A | 10/2014 |
| CN | 104090736 A | 10/2014 |
| GN | 103870193 A | 6/2014 |
| WO | 2013154565 A1 | 10/2013 |

OTHER PUBLICATIONS

Office Action issued in Chinese Application No. 201910950417.7 dated Aug. 26, 2020, 29 pages (with English translation).
Office Action issued in Chinese Application No. 201910950417.7 dated Jul. 5, 2021, 18 pages.

* cited by examiner

METHOD, APPARATUS, AND TERMINAL FOR PROCESSING NOTIFICATION INFORMATION

CROSS-REFERENCE TO RELATED APPLICATIONS

This application is a continuation of U.S. patent application Ser. No. 15/541,444, filed on Jul. 3, 2017, which is a national stage of International Application No. PCT/CN2015/070072, filed on Jan. 4, 2015. Both of the aforementioned applications are hereby incorporated by reference in their entireties.

TECHNICAL FIELD

The present invention relates to the field of terminal application technologies, and in particular, to a method, an apparatus, and a terminal for processing notification information.

BACKGROUND

With continuous development of mobile Internet technologies and hardware technologies, applications based on intelligent terminal devices (such as a smartphone, a tablet computer, and various electronic devices based on intelligence systems) also become more widespread. A notification, as a conventional processing mechanism of a device, can remind a user when the device receives different types of information, such as a short message service (Short Message Service, SMS) message, an incoming call, and a friend message in a social application.

Currently, using an intelligent terminal device based on an Android (Android) operating system of the Google (Google) company or an operating system (iOS) for Apple mobile devices of the Apple (Apple) company as an example, when information is notified on the device, a manner of performing reminding by using a top notification bar is used in most cases, and a user checks notification information by clicking or dropping down the notification bar, to click the notification information to start or switch to an application program to which the notification information belongs.

However, because a notification bar is generally located at an upper edge of a screen of a device, and current intelligent terminal devices develop with a tendency to be equipped with large screens. An operation of starting or switching to an application is performed according to notification information in the notification bar, resulting in complex steps of processing the notification information by a user and inconvenient operations, and relatively poor operation efficiency of the device.

SUMMARY

Embodiments of the present invention provide a method, an apparatus, and a terminal for processing notification information, so as to resolve a problem that an application is started according to notification information in a notification bar, causing complex steps of processing the notification information and inconvenient operations.

To achieve the foregoing objective, the following technical solutions are used in the embodiments of the present invention:

According to a first aspect, a method for processing notification information is provided, including:

detecting a user display operation;

triggering a display instruction corresponding to the user display operation, wherein the display instruction is used to instruct to display received notification information;

determining, according to an application identifier indicated by the notification information, a target application program corresponding to the notification information; and after it is determined that the target application program in a visible state exists on a current screen, and the target application program is in a window display mode, adjusting, according to a preset adjustment policy corresponding to the display instruction, one or more of a location, a size, or a display layer of a window corresponding to the target application program.

With reference to the first aspect, in a first possible implementation manner, the user display operation includes multiple different operation types, and the triggering a display instruction corresponding to the user display operation includes:

triggering, according to an operation type of the user display operation, a display instruction corresponding to the operation type; and the adjusting, according to a preset adjustment policy corresponding to the display instruction, one or more of a location, a size, or a display layer of a window corresponding to the target application program includes:

determining, according to a type of the triggered display instruction, an adjustment parameter corresponding to the display instruction, where the adjustment parameter includes target location coordinates and/or a target window size;

moving the window corresponding to the target application program to the target location coordinates, and/or adjusting the window corresponding to the target application program to the target window size; and when it is determined that the target application program is not an application program in a foreground of the screen, allocating a focus to the window corresponding to the target application program.

With reference to the first aspect or the first possible implementation manner of the first aspect, in a second possible implementation manner, before the adjusting, according to a preset adjustment policy corresponding to the display instruction, one or more of a location, a size, or a display layer of a window corresponding to the target application program, the method further includes:

recording an initial parameter for describing a current display status of the window corresponding to the target application program, where the initial parameter includes one or more of initial location coordinates, an initial window size, or an initial display layer; and after the adjusting, according to a preset adjustment policy corresponding to the display instruction, one or more of a location, a size, or a display layer of the window corresponding to the target application program, the method further includes:

detecting a user restoration operation;

triggering a restoration instruction corresponding to the user restoration operation, where the restoration instruction is used to instruct to restore, to an initial display status, the window that corresponds to the target application program and that is adjusted according to the preset adjustment policy; and adjusting, according to an indication of the restoration instruction by using the initial parameter, one or more of the display location, the window size, or the display layer of the window corresponding to the target application program.

With reference to any one of the first aspect to the second possible implementation manner of the first aspect, in a third possible implementation manner, after the adjusting, according to a preset adjustment policy corresponding to the display instruction, one or more of a location, a size, or a display layer of a window corresponding to the target application program, the method further includes:

determining a corresponding function module and/or message sender in the target application program according to an application module identifier and/or a sender identifier indicated by the notification information; and displaying the target application program as a corresponding operation screen according to the function module and/or the message sender.

With reference to any one of the first aspect to the third possible implementation manner of the first aspect, in a fourth possible implementation manner, after the adjusting, according to a preset adjustment policy corresponding to the display instruction, one or more of a location, a size, or a display layer of a window corresponding to the target application program, the method further includes:

detecting a user closing operation;

triggering a closing instruction corresponding to the user closing operation, where the closing instruction is used to instruct to close the target application program; and closing the target application program according to an indication of the closing instruction, so that the target application program is invisible on the screen.

With reference to the first aspect, in a fifth possible implementation manner, the method further includes:

after it is determined that the target application program in a visible state does not exist on the current screen, displaying the target application program in a preset user interface mode corresponding to the display instruction, where the preset user interface mode is a full-screen display mode or a window display mode.

With reference to the fifth possible implementation manner of the first aspect, in a sixth possible implementation manner, the displaying the target application program in a preset user interface mode corresponding to the display instruction includes:

when it is determined that any running application program exists in a foreground of the current screen, displaying the target application program in the window display mode in the foreground of the screen; or when it is determined that no running application program exists in a foreground of the current screen, displaying the target application program in the full-screen display mode in the foreground of the screen.

With reference to the fifth possible implementation manner or the sixth possible implementation manner of the first aspect, in a seventh possible implementation manner, the user display operation includes multiple different operation types, and the triggering a display instruction corresponding to the user display operation includes:

triggering, according to an operation type of the user display operation, a display instruction corresponding to the operation type; and when the preset user interface mode is the window display mode, the displaying the target application program in a preset user interface mode corresponding to the display instruction includes:

determining, according to a type of the triggered display instruction, a window display parameter corresponding to the display instruction, where the window display parameter includes display location coordinates and/or a display window size; and displaying, in the window display mode according to the window display parameter, the window corresponding to the target application program.

With reference to any one of the fifth possible implementation manner to the seventh possible implementation manner of the first aspect, in an eighth possible implementation manner, after the displaying the target application program in a preset user interface mode corresponding to the display instruction, the method further includes:

determining a corresponding function module and/or message sender in the target application program according to an application module identifier and/or a sender identifier indicated by the notification information; and displaying the target application program as a corresponding operation screen according to the function module and/or the message sender.

With reference to any one of the fifth possible implementation manner to the eighth possible implementation manner of the first aspect, in a ninth possible implementation manner, after the displaying the target application program in a preset user interface mode corresponding to the display instruction, the method further includes:

detecting a user closing operation;

triggering a closing instruction corresponding to the user closing operation, where the closing instruction is used to instruct to close the target application program; and closing the target application program according to an indication of the closing instruction, so that the target application program is invisible on the screen.

According to a second aspect, an apparatus for processing notification information is provided, including:

a detection unit, configured to detect a user display operation;

a triggering unit, configured to trigger a display instruction corresponding to the user display operation, where the display instruction is used to instruct to display received notification information;

a determining unit, configured to determine, according to an application identifier indicated by the notification information, a target application program corresponding to the notification information; and an adjustment unit, configured to: after it is determined that the target application program in a visible state exists on a current screen, and the target application program is in a window display mode, adjust, according to a preset adjustment policy corresponding to the display instruction, one or more of a location, a size, or a display layer of a window corresponding to the target application program.

With reference to the second aspect, in a first possible implementation manner, the user display operation detected by the detection unit includes multiple different operation types, and the triggering unit is configured to:

trigger, according to an operation type of the user display operation, a display instruction corresponding to the operation type; and the adjustment unit is configured to:

determine, according to a type of the triggered display instruction, an adjustment parameter corresponding to the display instruction, where the adjustment parameter includes target location coordinates and/or a target window size;

move the window corresponding to the target application program to the target location coordinates, and/or adjust the window corresponding to the target application program to the target window size; and when it is determined that the target application program is not an application program in a foreground of the screen, allocate a focus to the window corresponding to the target application program.

With reference to the second aspect or the first possible implementation manner of the second aspect, in a second possible implementation manner, the apparatus further includes: a recording unit and a restoration unit, where the recording unit is configured to: before the adjustment unit adjusts, according to the preset adjustment policy corresponding to the display instruction, one or more of the location, the size, or the display layer of the window corresponding to the target application program, record an initial parameter for describing a current display status of the window corresponding to the target application program, where the initial parameter includes one or more of initial location coordinates, an initial window size, or an initial display layer;

the detection unit is further configured to detect a user restoration operation after the adjustment unit adjusts, according to the preset adjustment policy corresponding to the display instruction, one or more of the location, the size, or the display layer of the window corresponding to the target application program;

the triggering unit is further configured to: after the detection unit detects and obtains the user restoration operation, trigger a restoration instruction corresponding to the user restoration operation, where the restoration instruction is used to instruct to restore, to an initial display status, the window that corresponds to the target application program and that is adjusted according to the preset adjustment policy; and the restoration unit is configured to: after the triggering unit triggers the restoration instruction, adjust, according to an indication of the restoration instruction by using the initial parameter, one or more of the display location, the window size, or the display layer of the window corresponding to the target application program.

With reference to any one of the second aspect to the second possible implementation manner of the second aspect, in a third possible implementation manner, the apparatus further includes: a navigation unit, configured to:

after the adjustment unit adjusts, according to the preset adjustment policy corresponding to the display instruction, one or more of the location, the size, or the display layer of the window corresponding to the target application program, determine a corresponding function module and/or message sender in the target application program according to an application module identifier and/or a sender identifier indicated by the notification information; and display the target application program as a corresponding operation screen according to the function module and/or the message sender.

With reference to any one of the second aspect to the third possible implementation manner of the second aspect, in a fourth possible implementation manner, the apparatus further includes: a closing unit, where the detection unit is further configured to detect a user closing operation after the adjustment unit adjusts, according to the preset adjustment policy corresponding to the display instruction, one or more of the location, the size, or the display layer of the window corresponding to the target application program;

the triggering unit is further configured to: after the detection unit detects and obtains the user closing operation, trigger a closing instruction corresponding to the user closing operation, where the closing instruction is used to instruct to close the target application program; and the closing unit is configured to close the target application program according to an indication of the closing instruction after the triggering unit triggers the closing instruction, so that the target application program is invisible on the screen.

With reference to the second aspect, in a fifth possible implementation manner, the apparatus further includes:

a display unit, configured to: after it is determined that the target application program in a visible state does not exist on the current screen, display the target application program in a preset user interface mode corresponding to the display instruction, where the preset user interface mode is a full-screen display mode or a window display mode.

With reference to the fifth possible implementation manner of the second aspect, in a sixth possible implementation manner, the display unit is configured to:

when it is determined that any running application program exists in a foreground of the current screen, display the target application program in the window display mode in the foreground of the screen; or when it is determined that no running application program exists in a foreground of the current screen, display the target application program in the full-screen display mode in the foreground of the screen.

With reference to the fifth possible implementation manner or the sixth possible implementation manner of the second aspect, in a seventh possible implementation manner, the user display operation detected by the detection unit includes multiple different operation types, and the triggering unit is configured to:

trigger, according to an operation type of the user display operation, a display instruction corresponding to the operation type; and when the preset user interface mode is the window display mode, the display unit is configured to:

determine, according to a type of the triggered display instruction, a window display parameter corresponding to the display instruction, where the window display parameter includes display location coordinates and/or a display window size; and display, in the window display mode according to the window display parameter, the window corresponding to the target application program.

With reference to any one of the fifth possible implementation manner to the seventh possible implementation manner of the second aspect, in an eighth possible implementation manner, the apparatus further includes: a navigation unit, configured to:

after the display unit displays the target application program in the preset user interface mode corresponding to the display instruction, determine a corresponding function module and/or message sender in the target application program according to an application module identifier and/or a sender identifier indicated by the notification information; and display the target application program as a corresponding operation screen according to the function module and/or the message sender.

With reference to any one of the fifth possible implementation manner to the eighth possible implementation manner of the second aspect, in a ninth possible implementation manner, the apparatus further includes: a closing unit, where the detection unit is further configured to detect a user closing operation after the display unit displays the target application program in the preset user interface mode corresponding to the display instruction;

the triggering unit is further configured to: after the detection unit detects and obtains the user closing operation, trigger a closing instruction corresponding to the user closing operation, where the closing instruction is used to instruct to close the target application program; and the closing unit is configured to close the target application program according to an indication of the closing instruction after the triggering unit triggers the closing instruction, so that the target application program is invisible on the screen.

According to a third aspect, a terminal for processing notification information is provided, including: a bus, and a processor, a memory, a communications module, an input module, and an output module that are connected to the bus, where the memory is configured to store instructions; and the processor executes the instructions to:

detect a user display operation;

trigger a display instruction corresponding to the user display operation, where the display instruction is used to instruct to display received notification information;

determine, according to an application identifier indicated by the notification information, a target application program corresponding to the notification information; and after it is determined that the target application program in a visible state exists on a current screen, and the target application program is in a window display mode, adjust, according to a preset adjustment policy corresponding to the display instruction, one or more of a location, a size, or a display layer of a window corresponding to the target application program.

With reference to the third aspect, in a first possible implementation manner, the user display operation includes multiple different operation types, and the processor executes the instructions to specifically:

trigger, according to an operation type of the user display operation, a display instruction corresponding to the operation type; and the processor executes the instructions to further specifically:

determine, according to a type of the triggered display instruction, an adjustment parameter corresponding to the display instruction, where the adjustment parameter includes target location coordinates and/or a target window size;

move the window corresponding to the target application program to the target location coordinates, and/or adjust the window corresponding to the target application program to the target window size; and when it is determined that the target application program is not an application program in a foreground of the screen, allocate a focus to the window corresponding to the target application program.

With reference to the third aspect or the first possible implementation manner of the third aspect, in a second possible implementation manner, before executing the instructions to adjust, according to the preset adjustment policy corresponding to the display instruction, one or more of the location, the size, or the display layer of the window corresponding to the target application program, the processor executes the instructions to further specifically:

record an initial parameter for describing a current display status of the window corresponding to the target application program, where the initial parameter includes one or more of initial location coordinates, an initial window size, or an initial display layer; and after executing the instructions to adjust, according to the preset adjustment policy corresponding to the display instruction, one or more of the location, the size, or the display layer of the window corresponding to the target application program, the processor executes the instructions to further specifically:

detect a user restoration operation;

trigger a restoration instruction corresponding to the user restoration operation, where the restoration instruction is used to instruct to restore, to an initial display status, the window that corresponds to the target application program and that is adjusted according to the preset adjustment policy; and adjust, according to an indication of the restoration instruction by using the initial parameter, one or more of the display location, the window size, or the display layer of the window corresponding to the target application program.

With reference to any one of the third aspect to the second possible implementation manner of the third aspect, in a third possible implementation manner, after executing the instructions to adjust, according to the preset adjustment policy corresponding to the display instruction, one or more of the location, the size, or the display layer of the window corresponding to the target application program, the processor executes the instructions to further specifically:

determine a corresponding function module and/or message sender in the target application program according to an application module identifier and/or a sender identifier indicated by the notification information; and display the target application program as a corresponding operation screen according to the function module and/or the message sender.

With reference to any one of the third aspect to the third possible implementation manner of the third aspect, in a fourth possible implementation manner, after executing the instructions to adjust, according to the preset adjustment policy corresponding to the display instruction, one or more of the location, the size, or the display layer of the window corresponding to the target application program, the processor executes the instructions to further specifically:

detect a user closing operation;

trigger a closing instruction corresponding to the user closing operation, where the closing instruction is used to instruct to close the target application program; and close the target application program according to an indication of the closing instruction, so that the target application program is invisible on the screen.

With reference to the third aspect, in a fifth possible implementation manner, the processor executes the instructions to further specifically:

after it is determined that the target application program in a visible state does not exist on the current screen, display the target application program in a preset user interface mode corresponding to the display instruction, where the preset user interface mode is a full-screen display mode or a window display mode.

With reference to the fifth possible implementation manner of the third aspect, in a sixth possible implementation manner, the processor executes the instructions to specifically:

when it is determined that any running application program exists in a foreground of the current screen, display the target application program in the window display mode in the foreground of the screen; or when it is determined that no running application program exists in a foreground of the current screen, display the target application program in the full-screen display mode in the foreground of the screen.

With reference to the fifth possible implementation manner or the sixth possible implementation manner of the third aspect, in a seventh possible implementation manner, the user display operation includes multiple different operation types, and the processor executes the instructions to specifically:

trigger, according to an operation type of the user display operation, a display instruction corresponding to the operation type; and the processor executes the instructions to further specifically:

determine, according to a type of the triggered display instruction, a window display parameter corresponding to the display instruction, where the window display parameter includes display location coordinates and/or a display window size; and display, in the window display mode according to the window display parameter, the window corresponding to the target application program.

With reference to any one of the fifth possible implementation manner to the seventh possible implementation manner of the third aspect, in an eighth possible implementation manner, after executing the instructions to display the target application program in the preset user interface mode corresponding to the display instruction, the processor executes the instructions to further specifically:

determine a corresponding function module and/or message sender in the target application program according to an application module identifier and/or a sender identifier indicated by the notification information; and display the target application program as a corresponding operation screen according to the function module and/or the message sender.

With reference to any one of the fifth possible implementation manner to the eighth possible implementation manner of the third aspect, in a ninth possible implementation manner, after executing the instructions to display the target application program in the preset user interface mode corresponding to the display instruction, the processor executes the instructions to further specifically:

detect a user closing operation;

trigger a closing instruction corresponding to the user closing operation, where the closing instruction is used to instruct to close the target application program; and close the target application program according to an indication of the closing instruction, so that the target application program is invisible on the screen.

As can be seen, by means of the method, apparatus, and terminal for processing notification information that are provided in the embodiments of the present invention, after a user display operation is detected, and a display instruction corresponding to the user display operation is triggered, a target application program corresponding to notification information is determined; and when it is determined that a screen display status meets a condition, a window corresponding to the target application program is adjusted according to a preset adjustment policy corresponding to the display instruction. In this way, a display status of a target application program corresponding to notification information is adjusted according to a preset interaction operation, avoiding a problem in the prior art that starting or switching to an application according to notification information in a notification bar causes complex steps of processing the notification information and inconvenient operations. Therefore, compared with the prior art, according to the present invention, operations of processing notification information can be simplified, controllability can be improved, and user experience of a device can be improved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
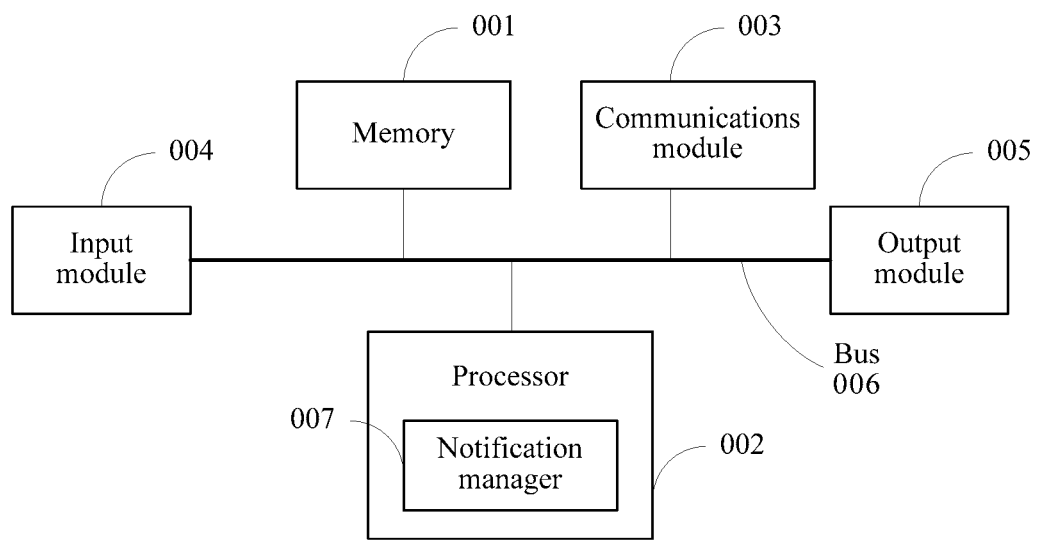
FIG. 1 is a schematic structural diagram of an electronic device according to an embodiment of the present invention.

FIG. 1 is a schematic structural diagram of an electronic device according to an embodiment of the present invention. The electronic device is configured to implement a method for processing notification information provided in the embodiments of the present invention. Referring to FIG. 1, the electronic device includes: a memory 001, a processor 002, a communications module 003, an input module 004, an output module 005, and a bus 006 connecting the foregoing modules.

The memory 001 is configured to store an operating system, an application program, related data, and the like. The processor 002 is configured to execute function applications and related data processing of the electronic device by running the operating system and/or the application program stored in the memory 001. It should be noted that the processor 002 coordinates with the memory 001 to release and/or manage all current notification information of the electronic device by using a notification manager 007 maintained in a module.

The communications module 003 is configured to provide a communication channel for the electronic device, so that the electronic device communicates with a remote electronic device or server in a form of speech, text, data, or the like by using the communication channel. The input module 004 is configured to implement interaction between a user and the electronic device, and provide an interaction status to the processor 002 for corresponding processing. The output module 005 is configured to implement output of data or information of the electronic device under the control of the processor 002, for example, displaying a user interface (User Interface, UI) or the like of an application program on a screen of the electronic device.

Further, in this embodiment of the present invention, the operating system stored in the memory 001 may be an embedded operating system, such as an Android system of the Google company, an iOS system of the Apple company, or a Windows system/Windows Phone system of the Microsoft (Microsoft) company.

An interaction manner provided by the input module 004 may be specifically implemented by using a physical key, a microphone, a touchscreen, and multiple different types of sensing devices (which include, but are not limited to, an acceleration sensor, a proximity sensor, and a gyro sensor).

An output form provided by the output module 005 may be using a display panel having an image output function as a screen of the electronic device to display output. The notification information managed in the notification manager 007 may be obtained (for example, in the iOS system) according to a message that is sent by a server and that is received by the electronic device, or may be released (for example, in the Android system) by invoking a system interface.

The operating systems, interaction manner, output form, and notification information obtaining manner that are listed above are only an example. Actual implementation forms may have some differences according to different hardware configurations or different application scenarios of the electronic device, and are not limited herein.

Figure 2:
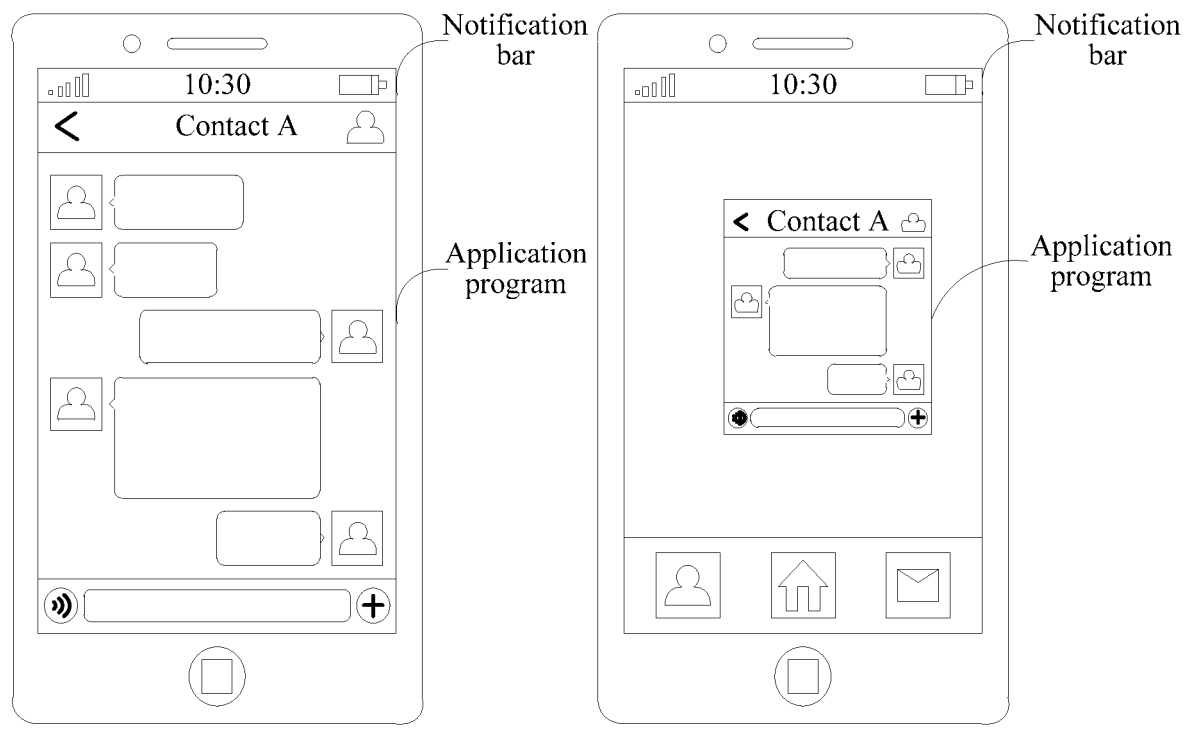
FIG. 2 is a schematic diagram 1 of a screen display mode of an electronic device according to an embodiment of the present invention.
Figure 3:
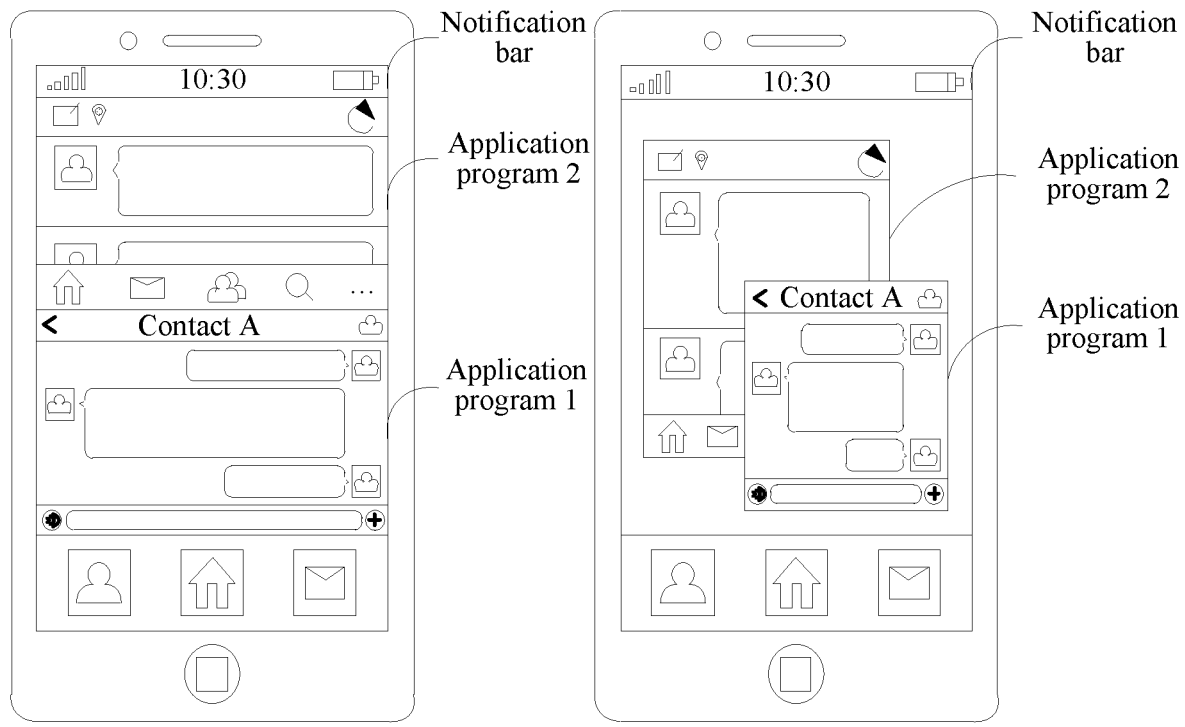
FIG. 3 is a schematic diagram 2 of a screen display mode of an electronic device according to an embodiment of the present invention.

It should be noted that the electronic device is based on the foregoing operating systems, and as shown in FIG. 2, a display status, which can be implemented by the processor 002 by controlling the output module 005, of a UI of an application program may include a full-screen display mode or a window display mode. Further, in the window display mode, a display manner of multiple windows on a same screen may be implemented. That is, application windows corresponding to UIs of multiple application programs are simultaneously displayed on one screen. As shown in FIG. 3, the display manner of multiple windows on a same screen may further specifically include: a split-screen multi-window mode (a screen is fully occupied by multiple application windows, and the application windows do not overlap each other) and a floating multi-window mode (multiple application windows may be moved, and may overlap each other).

Figure 4:
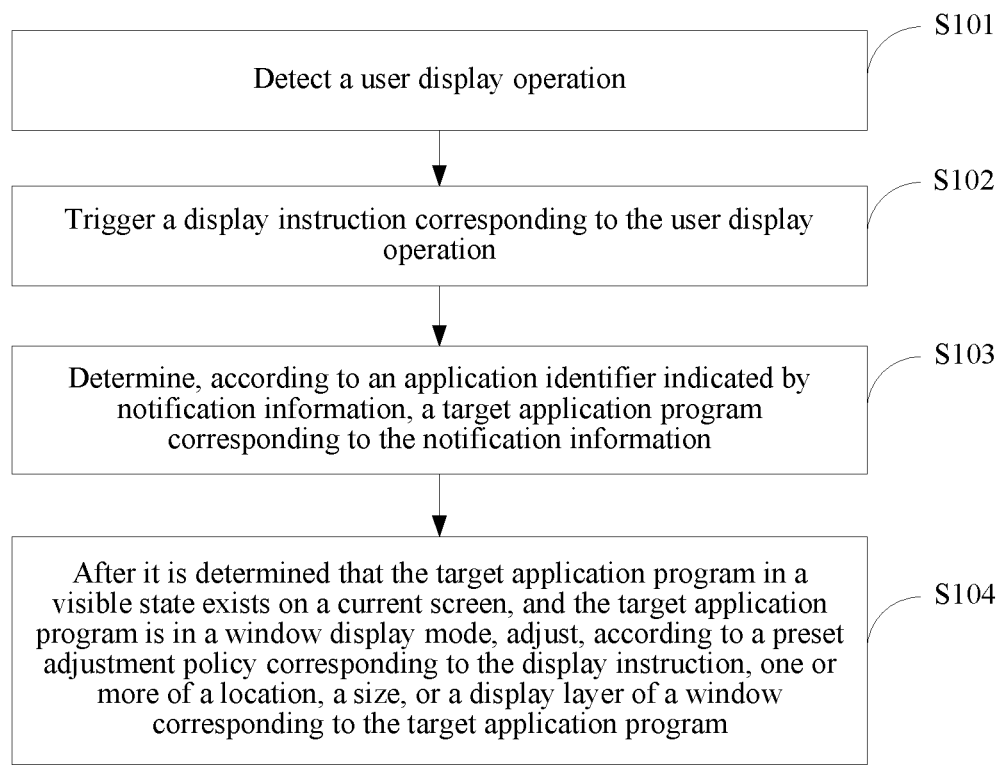
FIG. 4 is a schematic flowchart of a method for processing notification information according to an embodiment of the present invention.

An embodiment of the present invention provides a method for processing notification information. The method may be applied to the electronic device shown in FIG. 1 or a function module in the electronic device. As shown in FIG. 4, the method includes:

S101: Detect a user display operation.

S102: Trigger a display instruction corresponding to the user display operation.

The display instruction is used to instruct to display received notification information.

In an implementation manner, the user display operation includes multiple different operation types, and the electronic device may trigger, according to an operation type of the user display operation, a display instruction corresponding to the operation type.

S103: Determine, according to an application identifier indicated by notification information, a target application program corresponding to the notification information.

S104: After it is determined that the target application program in a visible state exists on a current screen, and the target application program is in a window display mode, adjust, according to a preset adjustment policy corresponding to the display instruction, one or more of a location, a size, or a display layer of a window corresponding to the target application program.

In an implementation manner, the operation of adjusting, by the electronic device according to a preset adjustment policy corresponding to the display instruction, one or more of a location, a size, or a display layer of a window corresponding to the target application program may specifically include:

determining, according to a type of the triggered display instruction, an adjustment parameter corresponding to the display instruction, where the adjustment parameter includes target location coordinates and/or a target window size;

moving the window corresponding to the target application program to the target location coordinates, and/or adjusting the window corresponding to the target application program to the target window size; and when it is determined that the target application program is not an application program in a foreground of the screen, allocating a focus to the window corresponding to the target application program.

In another implementation manner, before adjusting, according to the preset adjustment policy corresponding to the display instruction, one or more of the location, the size, or the display layer of the window corresponding to the target application program, the electronic device may further record an initial parameter for describing a current display status of the window corresponding to the target application program, where the initial parameter includes one or more of initial location coordinates, an initial window size, or an initial display layer; and further, after adjusting, according to the preset adjustment policy corresponding to the display instruction, one or more of the location, the size, or the display layer of the window corresponding to the target application program, the electronic device may further:

detect a user restoration operation;

trigger a restoration instruction corresponding to the user restoration operation, where the restoration instruction is used to instruct to restore, to an initial display status, the window that corresponds to the target application program and that is adjusted according to the preset adjustment policy; and further, adjust, according to an indication of the restoration instruction by using the initial parameter, one or more of the display location, the window size, or the display layer of the window corresponding to the target application program.

In another implementation manner, after adjusting, according to the preset adjustment policy corresponding to the display instruction, one or more of the location, the size, or the display layer of the window corresponding to the target application program, the electronic device may further:

determine a corresponding function module and/or message sender in the target application program according to an application module identifier and/or a sender identifier indicated by the notification information; and further, display the target application program as a corresponding operation screen according to the function module and/or the message sender.

In another implementation manner, after adjusting, according to the preset adjustment policy corresponding to the display instruction, one or more of the location, the size, or the display layer of the window corresponding to the target application program, the electronic device may further:

detect a user closing operation;

trigger a closing instruction corresponding to the user closing operation, where the closing instruction is used to instruct to close the target application program; and further, close the target application program according to an indication of the closing instruction, so that the target application program is invisible on the screen.

In another implementation manner, after it is determined that the target application program in a visible state does not exist on the current screen, the electronic device may further display the target application program in a preset user interface mode.

The preset user interface mode is a full-screen display mode or a window display mode.

In another implementation manner, further, the operation of displaying, by the electronic device, the target application program in a preset user interface mode corresponding to the display instruction may specifically include:

when it is determined that any running application program exists in the foreground of the current screen, displaying the target application program in the window display mode in the foreground of the screen; or when it is determined that no running application program exists in the foreground of the current screen, displaying the target application program in the full-screen display mode in the foreground of the screen.

In another implementation manner, further, when the preset user interface mode is the window display mode, the operation of displaying, by the electronic device, the target application program in a preset user interface mode corresponding to the display instruction may specifically include:

determining, according to a type of the triggered display instruction, a window display parameter corresponding to the display instruction, where the window display parameter includes display location coordinates and/or a display window size; and further, displaying, in the window display mode according to the window display parameter, the window corresponding to the target application program.

In another implementation manner, further, after displaying the target application program in the preset user interface mode corresponding to the display instruction, the electronic device may further:

determine a corresponding function module and/or message sender in the target application program according to an application module identifier and/or a sender identifier indicated by the notification information; and further display the target application program as a corresponding operation screen according to the function module and/or the message sender.

In another implementation manner, further, after displaying the target application program in the preset user interface mode corresponding to the display instruction, the electronic device may further:

detect a user closing operation;

trigger a closing instruction corresponding to the user closing operation, where the closing instruction is used to instruct to close the target application program; and further, close the target application program according to an indication of the closing instruction, so that the target application program is invisible on the screen.

This embodiment of the present invention provides a method for processing notification information. After a user display operation is detected, and a display instruction corresponding to the user display operation is triggered, a target application program corresponding to notification information is determined; and when it is determined that a screen display status meets a condition, a window corresponding to the target application program is adjusted according to a preset adjustment policy corresponding to the display instruction. In this way, a display status of a target application program corresponding to notification information is adjusted according to a preset interaction operation, avoiding a problem that starting or switching to an application according to notification information in a notification bar causes complex steps of processing the notification information and inconvenient operations. Therefore, operations of processing notification information can be simplified, controllability can be improved, and user experience of a device can be improved.

Figure 5:
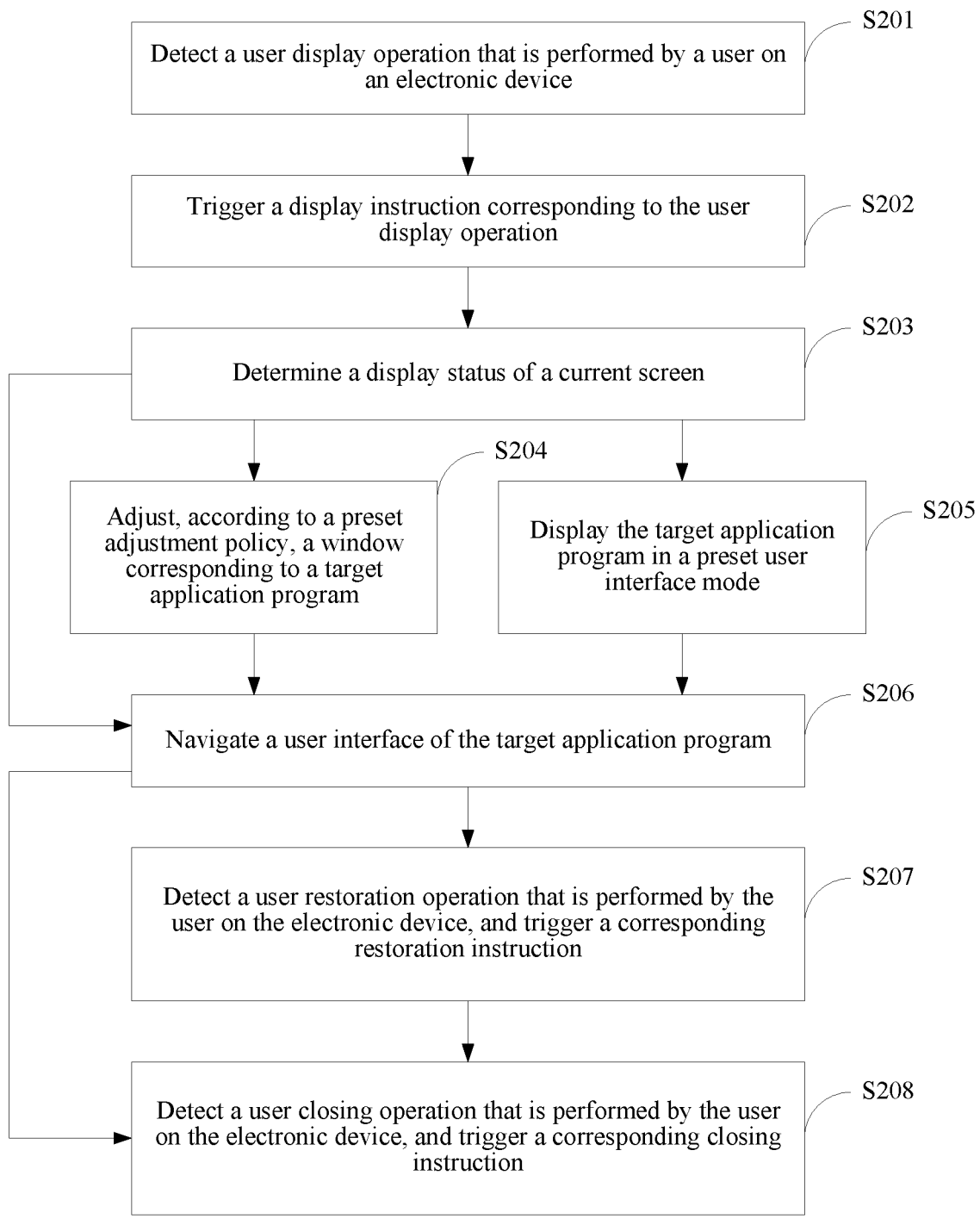
FIG. 5 is a schematic flowchart of another method for processing notification information according to an embodiment of the present invention.

To enable a person skilled in the art to understand the technical solutions provided in the embodiments of the present invention more clearly, based on the electronic device shown in FIG. 1, the following describes in detail another method for processing notification information according to an embodiment of the present invention by using specific embodiments. As shown in FIG. 5, the method includes:

S201: Detect a user display operation that is performed by a user on an electronic device.

Specifically, an input module of the electronic device detects the user display operation that is performed by the user on the electronic device, generates corresponding interaction operation information, and transfers the interaction operation information to a processor.

The user display operation may include forms, such as a preset display action, gesture, or voice. The operation performed by the user on the electronic device may be detected by interaction detection devices in the input module. For example, a touch control operation is detected by using a touchscreen, voice control is detected by using a microphone, and an action operation is detected by using an action-related sensing device.

The foregoing user display operation may be set in a device by default or may be set by the user through external input. A specific setting operation form is not limited herein.

S202: Trigger a display instruction corresponding to the user display operation.

Specifically, after obtaining the corresponding interaction operation information that is generated when the input module detects the user display operation that is performed by the user on the electronic device, the processor of the electronic device determines whether notification information that is not processed exists currently, and if the processor determines that the notification information currently exists in the notification manager of the electronic device, triggers the display instruction corresponding to the user display operation.

The display instruction is an instruction that is triggered by the processor in response to the user display operation of the user on the premise that the processor determines that the notification information that is not processed exists currently, and is used to instruct to display received notification information. Implementation forms of the display instruction on modules of the electronic device are not limited herein. The display instruction may be a message, a data packet, and the like, and fall within the protection scope of this embodiment of the present invention as long as the display instruction can be used as identifiers for instructing the modules to perform corresponding operations.

For example, as an example, the user display operation is an action of wobbling a device side to side (whose type is a preset display action). An application scenario in which the processor determines that the notification information currently exists in the notification manager may specifically include:

When releasing the notification information, the notification manger of the electronic device displays, by using an output module, the notification information in a notification bar for reminding. If an acceleration sensor in the input module detects, within a preset response time after the notification bar starts to display the notification information, the operation of wobbling the device side to side by the user, the acceleration sensor transfers, to the processor, interaction operation information indicating that the device is wobbled side to side, and then the processor triggers the display instruction, to instruct to perform a subsequent operation, and determines a current status of a screen.

Alternatively, when a moment at which an acceleration sensor in the input module detects the operation of wobbling the device side to side by the user does not fall within a preset response time after the notification manager displays any notification information in a notification bar, after determining, through querying, that at least one piece of notification information exists in the notification manager, the processor of the electronic device triggers the display instruction, to instruct to perform a subsequent operation, and determines a status of a current screen; or if the electronic device determines that no notification information exists in the notification manager, the action of the user is not responded.

The preset response time is a time range in which the electronic device can directly trigger the corresponding display instruction after receiving the user display operation of the user, without needing to perform determining for the notification manager. The preset response time is greater than or equal to duration in which after receiving the notification information, the electronic device displays, by using the notification bar, the notification information to remind the user, and may be set in a system by default, or may be given by the user through external input, which is not limited herein.

It should be noted that the user may interact with the electronic device by using different types of user display operations, and the processor of the electronic device triggers different types of corresponding display instructions according to the types of the user display operations. In this embodiment, multiple different types of user display operations may be simultaneously set for the device, so that the processor triggers corresponding display instructions. Moreover, corresponding types may be identified for the display instructions corresponding to the different types of user display operations in advance. For example, a display instruction corresponding to the operation of wobbling the device side to side is identified as a first operation type, and a display instruction corresponding to an operation of wobbling the device up and down is identified as a second operation type. Therefore, when performing subsequent processing on the notification information, the electronic device may distinguish, according to the types of the display instructions, interaction operations used by the user to trigger notification information processing operations, and different processing manners are used for different interaction operations.

Moreover, a correspondence between the multiple different types of user display operations and the types of the display instructions may be set in the device by default or may be set by the user through external input, and is recorded in the electronic device in advance. A specific corresponding manner is not limited herein.

S203: Determine a display status of a current screen.

Specifically, after triggering the display instruction corresponding to the user display operation, the electronic device obtains the display status of the current screen by invoking a system interface, and determines whether the target application program in a visible state exists on the current screen.

The target application program is an application program to which the notification information belongs. It should be noted that the electronic device may obtain, by using the notification manager, a related parameter corresponding to the notification information, for example, an application identifier of the notification information, where the application identifier is used to indicate related identifier information (such as a name of an application program or a path of an application program) of the application program to which the notification information belongs. Therefore, the target application program corresponding to the notification information can be determined according to the application identifier indicated by notification information. For example, if the notification information is information about a short message service message, the corresponding target application program is a short message application. If the notification information is a direct message from a microblog friend, the corresponding target application program is a microblog client. The foregoing target application programs are an example, and the target application program includes but is not limited to the foregoing examples.

That the target application program is in a visible state refers to that a user interface of the target application program is displayed at a location, which is visible to the user, on the screen of the electronic device. Moreover, it should be noted that, the target application program in a visible state may be displayed in the foreground of the screen (a user interface is completely visible to the user), and already obtains a focus (Focus), that is, the target application program can interact with the user; or may be displayed in a background of the screen (a user interface may be completely visible to the user, or may be partially visible to the user), and already loses a focus, that is, before obtaining a focus again and switching to a foreground of the screen, the target application program cannot interact with the user.

For example, using an Android system as an example, a status of the target application program may include: an active state or a running state (the target application program runs in the foreground of the screen), a paused state (the target application program loses the focus, but is still visible to the user), a stopped state (the target application program is completely covered by another application program and becomes dim), and a terminated state (the target application program is removed by the system from the memory).

Further, the electronic device invokes the system interface by using the processor, obtains the display status of the current screen in the output module, and determines whether the target application program in a visible state exists on the current screen. Moreover, the operation may be implemented based on determining performed on the status of the target application program, and may specifically include:

when the electronic device determines that the target application program is in a paused state (that is, the target application program is visible on the current screen, and a used display mode is a window display mode), an operation of step S204 is performed, and a window corresponding to the target application program is adjusted according to a preset adjustment policy; or when it is determined that the target application program is in a stopped or terminated state (that is, the target application program is invisible on the current screen), an operation of step S205 is performed, and the target application program is displayed in a preset user interface mode; and it should be noted that, when it is determined that the target application program is an active state or a running state (that is, the target application program is running in the foreground of the screen), an operation of step S206 may be directly performed, and a user interface of the target application program is navigated, and is displayed as a corresponding functional interface; or after it is determined that the target application program is in a window display mode, an operation of step S204 may be further performed, and a window corresponding to the target application program is adjusted according to a preset adjustment policy.

Optionally, when determining that the target application program is in a paused state, the electronic device may further control, by using the processor, the output module to enable the window corresponding to the target application program to present a preset visual effect, so that an effect of reminding the user is achieved. The preset visual effect may include: window flicker, highlighting, being translucent, and the like. The foregoing listed effects are only an example, and the preset visual effect includes but is not limited to the foregoing examples.

S204: Adjust, according to a preset adjustment policy, a window corresponding to a target application program.

Specifically, after determining that the target application program in a visible state exists on the current screen, and the target application program is in the window display mode, the processor of the electronic device adjusts, according to the preset adjustment policy corresponding to the display instruction, one or more of a location, a size, or a display layer of the window corresponding to the target application program.

The preset adjustment policy indicates an adjustment parameter required for adjusting the window corresponding to the target application program, and the adjustment parameter may include target location coordinates when the corresponding window is moved, and/or a target size when the corresponding window is zoomed. Moreover, in an actual application scenario, a correspondence between a display instruction and a preset adjustment policy may be set in a system by default, or may be given by the user through external input, and is prestored in the electronic device. A specific correspondence is not limited herein.

Moreover, it should be noted that when the screen is displayed in a multi-window mode, windows corresponding to application programs have different display layers, and are sequentially in an overlapped state. When a display layer of a window corresponding to an application program is at a first layer (an uppermost layer), the application program is an application program in the foreground of the screen, and is allocated a focus. When the window corresponding to the target application program is to be adjusted according to the preset adjustment policy, if the display layer of the corresponding window in an initial state before adjustment is not the first layer, the display layer of the corresponding window needs to be adjusted to the first layer during adjustment, so that the target application program obtains a focus, that is, the target application program can interact with the user; or if the display layer of the corresponding window in an initial state before adjustment is the first layer, the display layer of the corresponding window does not need to be adjusted.

For example, when the electronic device adjusts, according to the preset adjustment policy corresponding to the display instruction, the window corresponding to the target application program, the adjustment parameter used in the preset adjustment policy may be set in the system by default or may be preselected by the user through external input. For example, same preset target location coordinates and/or a same preset target size is used without exception, and a specific status of setting the target location coordinates and the target size is not limited herein. Optionally, it may be further restricted that a preset target size needs to be less than a size of the screen, that is, an adjustment manner provided in the preset adjustment policy does not include a display manner of switching the window corresponding to the target application program to the full-screen display mode, ensuring that the target application program can be always displayed in the window display mode.

Alternatively, the adjustment parameter used in the preset adjustment policy corresponding to the display instruction may be further selected, according to an interaction operation form used by the user, based on a pre-established correspondence between different types of display instructions and adjustment parameters.

Figure 6:
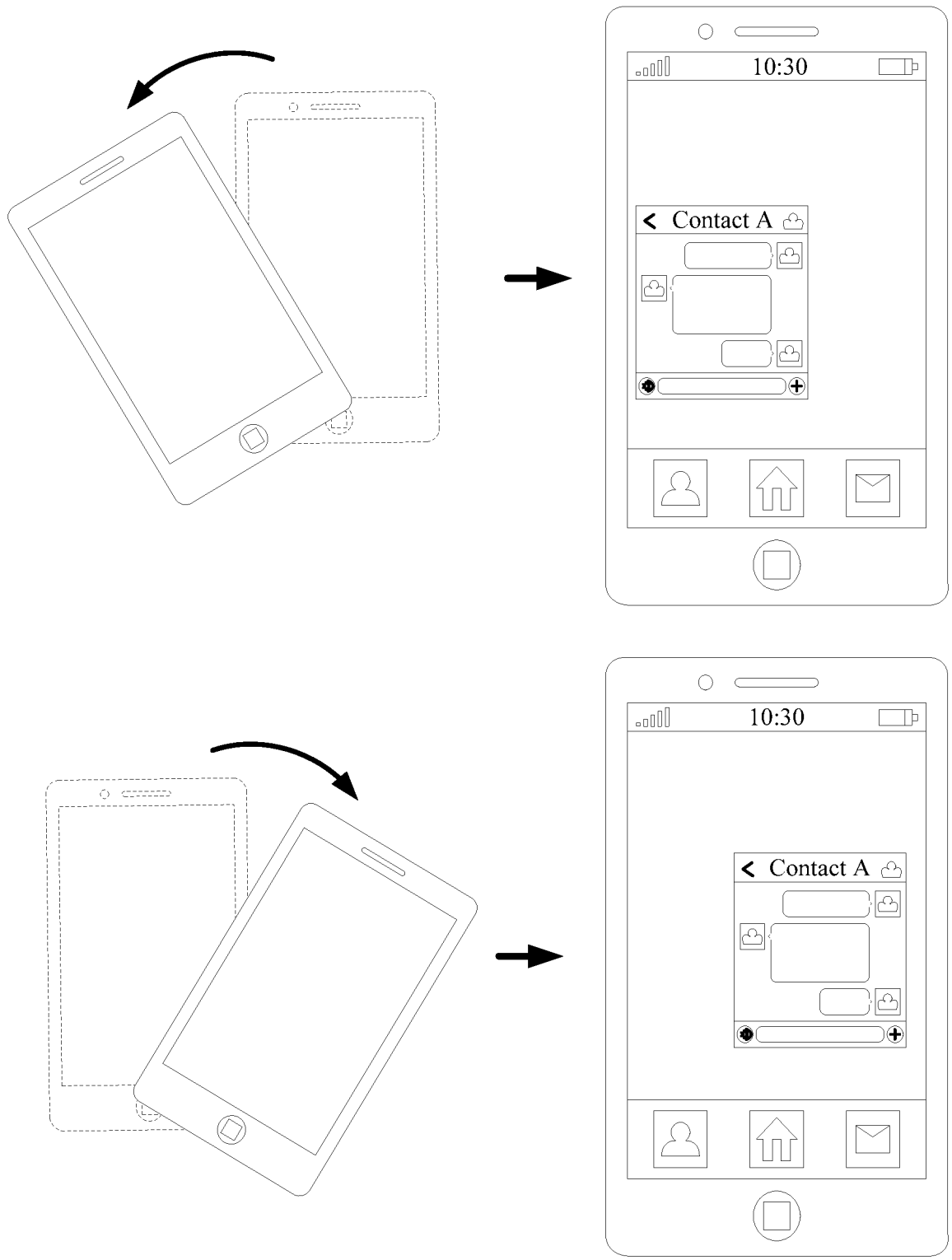
FIG. 6 is a schematic diagram 1 of an processing effect of an interaction operation according to an embodiment of the present invention.

For example, as shown in FIG. 6, assuming that an application program 1 is a target application program, a display instruction corresponding to an operation of tilting a device to the left is of a third operation type, and a display instruction corresponding to an operation of tilting a device to the right is of a fourth operation type, when the detected user display operation is the operation of tilting the device to the left, and the display instruction of the third operation type is triggered, the adjustment parameter (the adjustment parameter indicates coordinates of a location on the left side of the screen) corresponding to the type of the display instruction may be determined, the corresponding window is then moved to an indicated location according to the adjustment parameter, and a focus is allocated to the corresponding window, so that the corresponding window is located in the foreground of the screen; or when the detected user display operation is the operation of tilting the device to the right, and the display instruction of the fourth operation type is triggered, the adjustment parameter (the adjustment parameter indicates coordinates of a location on the right side of the screen) corresponding to the type of the display instruction may be determined, the corresponding window is then moved to an indicated location according to the adjustment parameter, and a focus is allocated to the corresponding window, so that the window is located in the foreground of the screen.

Moreover, the correspondence between a type of a display instruction and an adjustment parameter is only an example, and in an actual application scenario, may be set in a system by default, or may be given by the user through external input, and is prestored in the electronic device. A specific correspondence includes but is not limited to the foregoing example.

Optionally, before the electronic device adjusts, according to the preset adjustment policy, the window corresponding to the target application program, if target location coordinates that are indicated by a selected adjustment parameter are currently blocked by a window of any other application program, before the window corresponding to the target application program is moved to the target location coordinates, the blocking window of the application program may be moved to a current location of the window corresponding to the target application program or any idle area on the screen that does not block the target location coordinates. It should be noted that, before the blocking window of the application program is moved, a location and a display layer of the window of the application need to be recorded, so that a display status of the window of the application is restored in subsequent operations.

Optionally, after the window corresponding to the target application program is moved to the target location coordinates and is allocated a focus, if a foreground application program before the adjustment operation is blocked, the processor of the electronic device may further make the window corresponding to the target application program translucent by controlling the output module, and keep the foreground application program, before the adjustment operation, running continuously, to avoid interruption of an ongoing activity of the user.

Further, preferably, before adjusting, according to the preset adjustment policy, the window corresponding to the target application program, the electronic device further needs to record in advance current initial location coordinates, an initial window size, and an initial display layer of the window corresponding to the target application program, so that the display status of the window corresponding to the target application program is restored according to the recorded initial parameters in subsequent operations.

Further, after adjusting, according to the preset adjustment policy, the window corresponding to the target application program, the electronic device performs step S206, a user interface navigates a user interface of the target application program, and displays the user interface as a corresponding functional interface.

S205: Display the target application program in a preset user interface mode.

Specifically, after determining that the target application program in a visible state does not exist on the current screen, the processor of the electronic device displays the target application program in the preset user interface mode corresponding to the display instruction.

The preset user interface mode may be a full-screen display mode or a window display mode. Moreover, in an actual application scenario, a correspondence between a display instruction and a preset user interface mode may be set in a system by default, or may be given by the user through external input, and is prestored in the electronic device. A specific correspondence is not limited herein.

It should be noted that, if the target application program is in a stopped state (that is, the target application program may run in the background of the electronic device), the user interface corresponding to the target application program may be directly displayed or directly switched to; or if the target application program is in a terminated state (that is, the target application program is completely exited or closed), after the target application program is started by invoking a system interface, the user interface corresponding to the target application program needs to be displayed or switched to.

For example, when the electronic device displays the target application program in the preset user interface mode corresponding to the display instruction, a type of the used preset user interface mode may be set in a system by default or may be preselected by the user through external input. For example, the full-screen display mode or the window display mode is used as the selected preset user interface mode without exception, and a specific preset selection manner is not limited herein.

Alternatively, the type of the used preset user interface mode may be further selected, according to an interaction operation form used by the user, based on a pre-established correspondence between a different type of a display instruction and a preset user interface mode.

Figure 7:
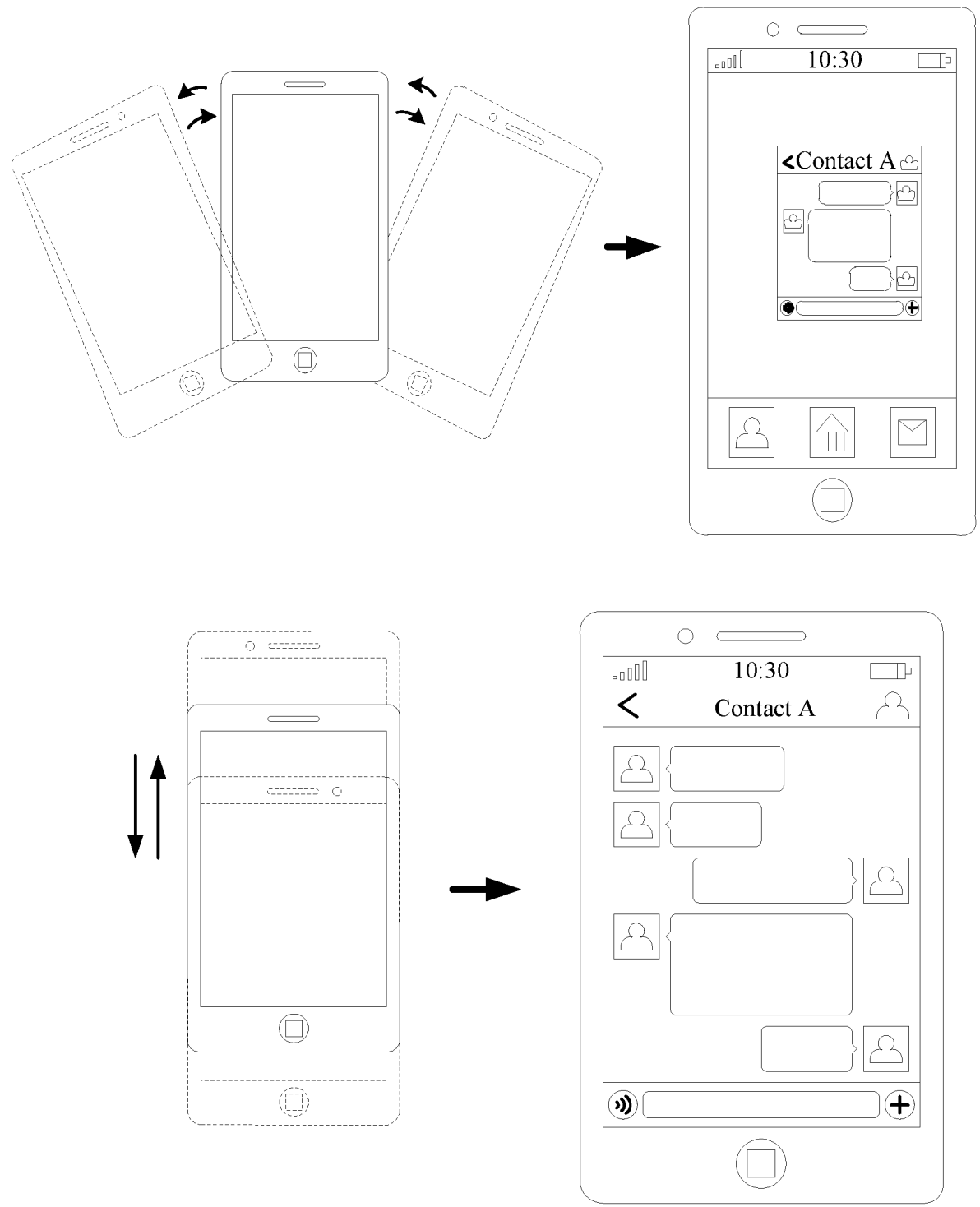
FIG. 7 is a schematic diagram 2 of an processing effect of an interaction operation according to an embodiment of the present invention.

For example, as shown in FIG. 7, assuming that a display instruction corresponding to an operation of wobbling a device side to side is of a first operation type, and a display instruction corresponding to an operation of wobbling a device up and down is of a second operation type, the pre-established correspondence may include:

when the triggered display instruction is the display instruction, which corresponds to the operation of wobbling the device side to side, of the first operation type, the used preset user interface mode is the window display mode; or when the triggered display instruction is a display instruction, which corresponds to the operation of wobbling the device up and down, of the second operation type, the used preset user interface mode is the full-screen display mode.

Further, alternatively, the type of the used preset user interface mode may be further selected according to the display status of the current screen. Using the Android operating system as an example, the type of the used preset user interface mode may specifically include:

when the processor determines that any application program in an active state or in a running state currently exists (that is, any running application program exists in the foreground of the current screen), the target application program is displayed in the foreground in the window display mode, which can avoid complete blocking of an application program currently running in the foreground while displaying the target application program; or when the processor determines that all application programs of the device are in a terminated state (that is, no running application program exists in the foreground of the current screen), the target application program is displayed in the foreground in the full-screen display mode, to achieve an optimal display effect.

Further, preferably, when the window display mode is selected as the preset user interface mode, a display parameter used in the window display mode may be further determined according to an interaction operation form used by the user, based on a pre-established correspondence between a different type of a display instruction and a window display mode, where the display parameter may include a display window size and/or display location coordinates or the like of a display window corresponding to the target application program. A display manner when the window corresponding to the target application program is displayed in the window display mode can be determined according to the interaction operation form used by the user.

Figure 8:
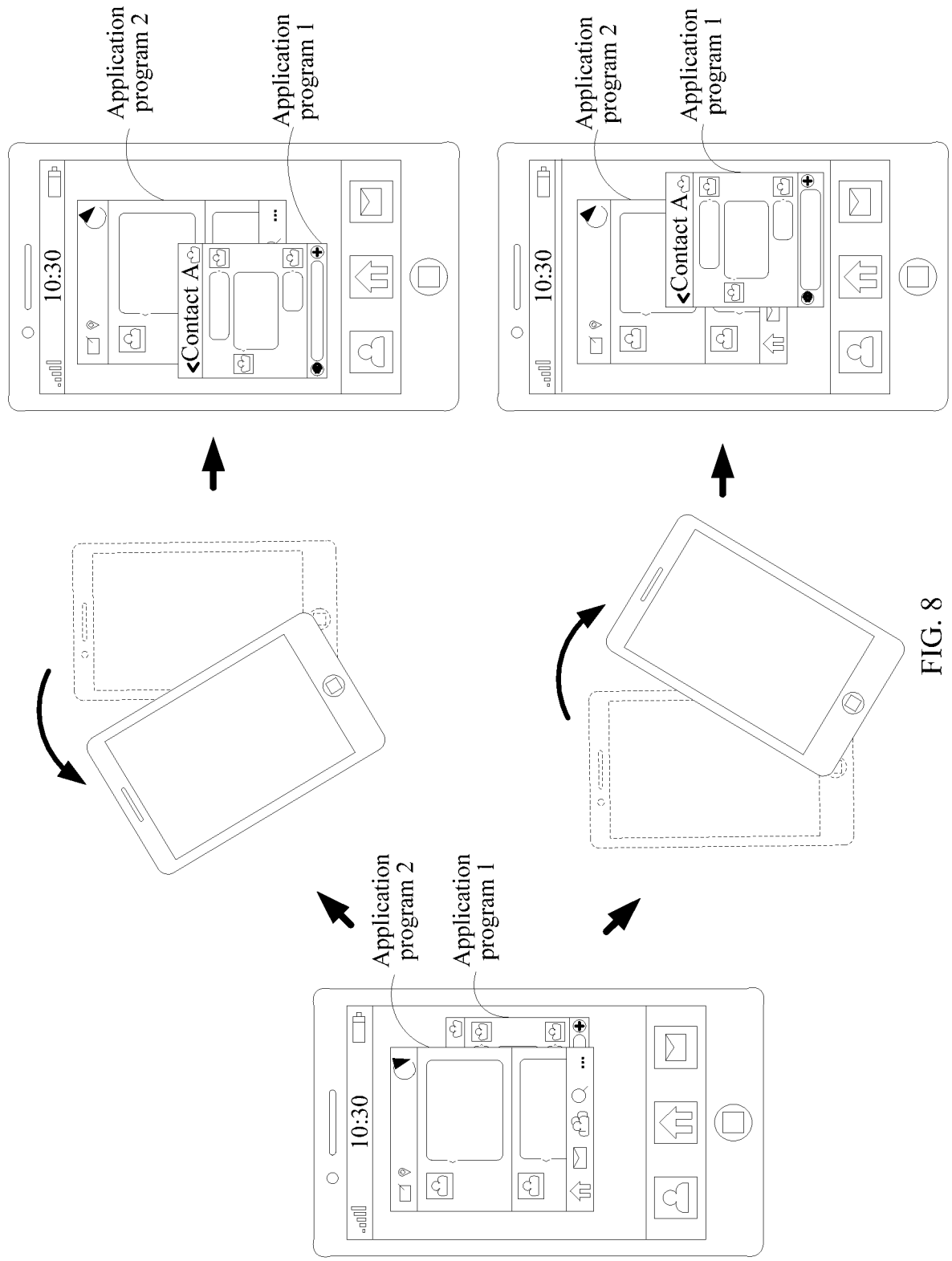
FIG. 8 is a schematic diagram 3 of an processing effect of an interaction operation according to an embodiment of the present invention.

For example, as shown in FIG. 8, assuming that a display instruction corresponding to an operation of tilting a device to the left is of a third operation type, and a display instruction corresponding to an operation of tilting a device to the right is of a fourth operation type, when the detected user display operation is the operation of tilting the device to the left, and the display instruction of the third operation type is triggered, a display parameter (the display parameter indicates coordinates of a location on the left side of the screen) corresponding to the type of the display instruction may be determined, so as to display a corresponding window on the left side of the screen; or when the detected user display operation is the operation of tilting the device to the right, and the display instruction of the fourth operation type is triggered, a display parameter (the display parameter indicates coordinates of a location on the right side of the screen) corresponding to the type of the display instruction may be determined, so as to display a corresponding window on the right side of the screen.

Moreover, in an actual application scenario, a correspondence between a type of a display instruction and a display parameter may be set in a system by default, or may be given by the user through external input, and is prestored in the electronic device. A specific correspondence includes but is not limited to the foregoing examples.

Optionally, when determining that any application program in an active state or in a running state currently exists, and the target application program is displayed in the foreground in the window display mode, the processor may further make the window corresponding to the target application program translucent by controlling the output module, and keep the application program in an active state or in a running state running continuously, to avoid interruption of an activity that is currently being done by the user.

Further, after displaying the target application program in the preset user interface mode, the electronic device performs step S206, a user interface navigates a user interface of the target application program, and displays the user interface as a corresponding functional interface.

It should be noted that, as can be known according to the operation of step S204 and the operation of step S205, the correspondence between a display instruction and a preset adjustment policy and the correspondence between a display instruction and a preset user interface mode are not limited in this embodiment. Therefore, a same display instruction may correspond to both one preset adjustment policy and one preset display mode, that is, when one user display operation is used to trigger a process of processing notification information, a processing manner selected and used by the electronic device is further related to the display status of the current screen. For example, when it is determined that the target application program in a visible state exists on the current screen, and the target application program is in the window display mode, the window corresponding to the target application program is adjusted according to the preset adjustment policy corresponding to the display instruction; or when it is determined that the target application program in a visible state does not exist on the current screen, the target application program is displayed in the preset user interface mode corresponding to the display instruction.

Further, in an implementation manner, according to a setting requirement of the user, even if the display status of the current screen is different, a final effect of performing an adjustment by using the preset adjustment policy corresponding to the same display instruction or performing display by using the preset display mode corresponding to the same display instruction may be the same (as shown by the application program 1 in FIG. 6 and FIG. 8).

S206: Navigate a user interface of the target application program.

Specifically, after adjusting, according to the preset adjustment policy, the window corresponding to the target application program, or displaying the target application program in the preset user interface mode, the electronic device determines, according to the notification information in the notification manager, an application module identifier and/or a sender identifier indicated by the notification information, further determines a function module and/or the message sender corresponding to the notification information, and displays the target application program as a corresponding interface.

For example, using a case in which a WeChat (Wechat) client in the Android operating system as the target application program as an example, if the notification information in the notification manager is chat dialog information sent by a WeChat contact A, a function module indicated by a corresponding application module identifier in the WeChat client may be determined as a chat function module according to the notification information, and a message sender indicated by a sender identifier is the contact A. Therefore, a display interface of the WeChat client may be navigated to the contact A in the chat function module, and is displayed as a user interface of chatting with the contact A.

It should be noted that if the electronic device performs the operation of this step after adjusting, according to the preset adjustment policy, the window corresponding to the target application program, after the user interface of the target application program is navigated, an operation of step S207 may be performed, a user restoration operation by the user on the electronic device is detected, and a display status of the window corresponding to the target application program that is adjusted according to the preset adjustment policy corresponding to the display instruction is restored. In addition, an operation of step S208 may be directly performed, to close the target application program.

Alternatively, if the electronic device performs the operation of this step after displaying the target application program in the preset user interface mode corresponding to the display instruction, after the user interface of the target application program is navigated, an operation of step S208 may be directly performed, to close the target application program.

S207: Detect a user restoration operation that is performed by the user on the electronic device, and trigger a corresponding restoration instruction.

Specifically, if the input module of the electronic device detects the user restoration operation that is performed by the user on the electronic device, generates corresponding interaction operation information, and transfers the interaction operation information to the processor, and the processor then determines that the target application program is in an active state or in a running state (that is, the target application program is not closed and is maintained as a foreground application program), the restoration instruction is triggered, to restore the display status of the window corresponding to the target application program.

The user restoration operation may include forms, such as a preset restoration action, gesture, or voice. The user restoration operation may be set in a device by default or may be set by the user through external input. However, it should be noted that the set restoration action, gesture, or voice cannot be the same as those included in the set user display operation, and a specific operation form is not limited herein.

The restoration instruction is an instruction triggered in response to the user restoration operation of the user on the premise that the processor determines that the current target application program is not closed and is maintained as the foreground application program, and is used to instruct to restore the display status of the window corresponding to the target application program adjusted according to the preset adjustment policy. Implementation forms of the restoration instruction on modules of the electronic device are not limited, and may be a message, a data packet, and the like. The forms all fall within the protection scope of this embodiment of the present invention as long as the forms can be used as identifiers for instructing the modules to perform corresponding operations.

Figure 9:
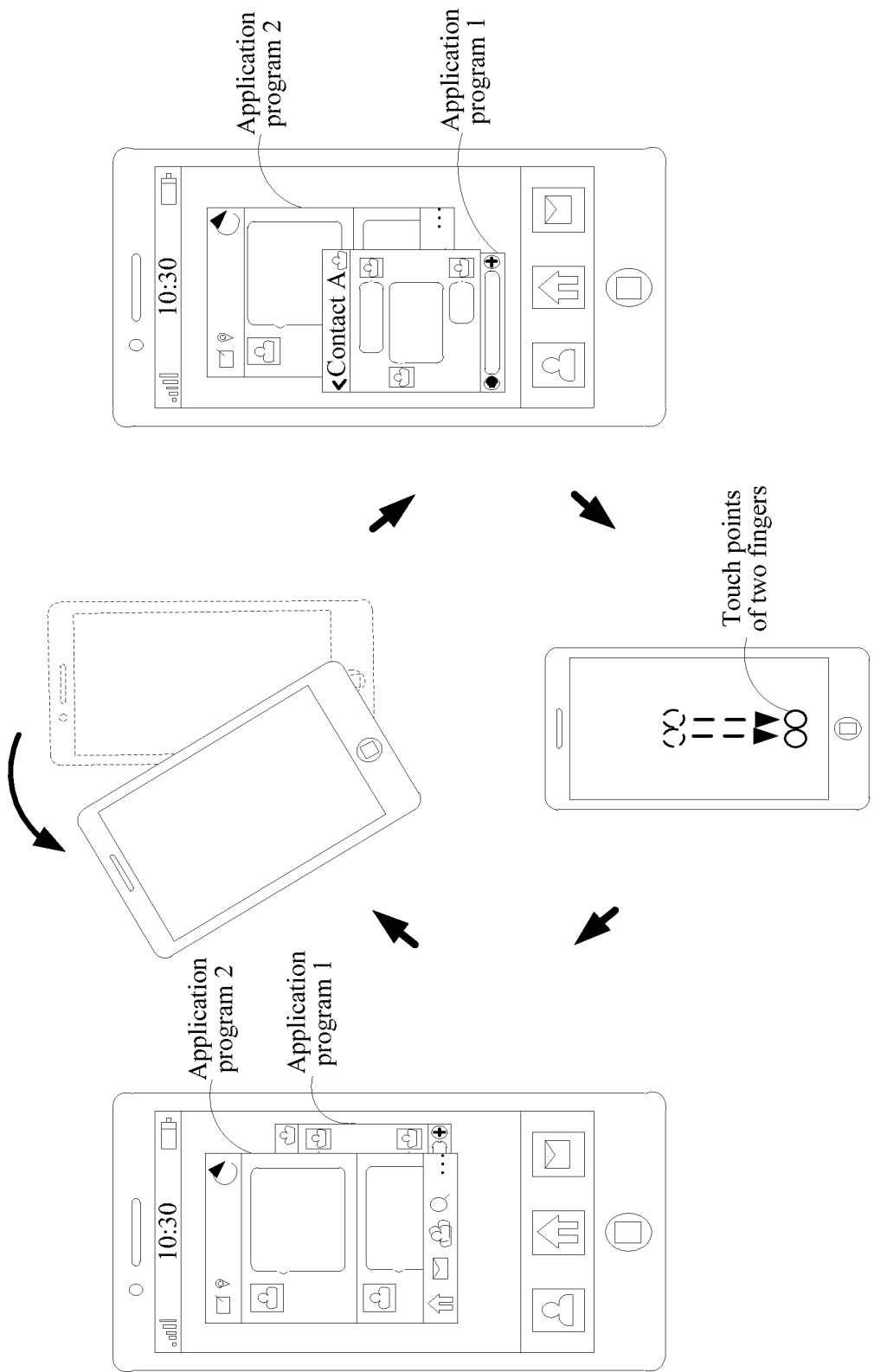
FIG. 9 is a schematic diagram 4 of an processing effect of an interaction operation according to an embodiment of the present invention.

For example, as shown in FIG. 9, as an example, an application program 1 is the target application program, and the user restoration operation is a gesture that two fingers slide down (whose type is a preset restoration gesture). After the window corresponding to the target application program is adjusted according to the preset adjustment policy corresponding to the display instruction, the input module of the electronic device detects the gesture operation that two fingers slide down and that is performed by the user on the electronic device. If the processor determines that the target application program is currently in an active state or in a running state (that is, the target application program is not closed and is maintained as the foreground application program), a restoration instruction is triggered, one or more of the location, size, or display layer of the corresponding window are then adjusted according to the recorded initial location coordinates, the recorded initial window size, and the recorded initial display layer of the window corresponding to the target application program, and the initial display status of the corresponding window is restored.

Optionally, if the electronic device adjusts, according to the preset adjustment policy, the window corresponding to the target application program, an operation of moving an application window blocking target location coordinates to another location exists, and the application window further needs to be restored according to a recorded location and a recorded display layer of the blocking application window.

Then, the electronic device may further perform the operation of step S208 after the display status of the window corresponding to the target application program is restored, to close the target application program.

S208: Detect a user closing operation that is performed by the user on the electronic device, and trigger a corresponding closing instruction.

Specifically, if the input module of the electronic device detects the user closing operation that is performed by the user on the electronic device, generates corresponding interaction operation information, and transfers the interaction operation information to the processor, and the processor then determines that the target application program is not in a terminated state (that is, the target application program is not closed), the closing instruction is triggered, to perform a closing operation on the target application program.

The user closing operation may include forms, such as a preset display action, gesture, or voice. The user closing operation may be set in a device by default or may be set by the user through external input. However, it should be noted that the set closing action, gesture, or voice cannot be the same as those included in the set user display operation or user restoration operation, and a specific operation form is not limited herein.

The closing instruction is an instruction triggered in response to the user closing operation of the user on the premise that the processor determines that the current target application program is not closed, and is used to instruct to close the target application program corresponding to the notification information processed after the user display operation is responded. Implementation forms of the closing instruction on modules of the electronic device are not limited, and may be a message, a data packet, and the like. The forms all fall within the protection scope of this embodiment of the present invention as long as the forms can be used as identifiers for instructing the modules to perform corresponding operations.

Figure 10:
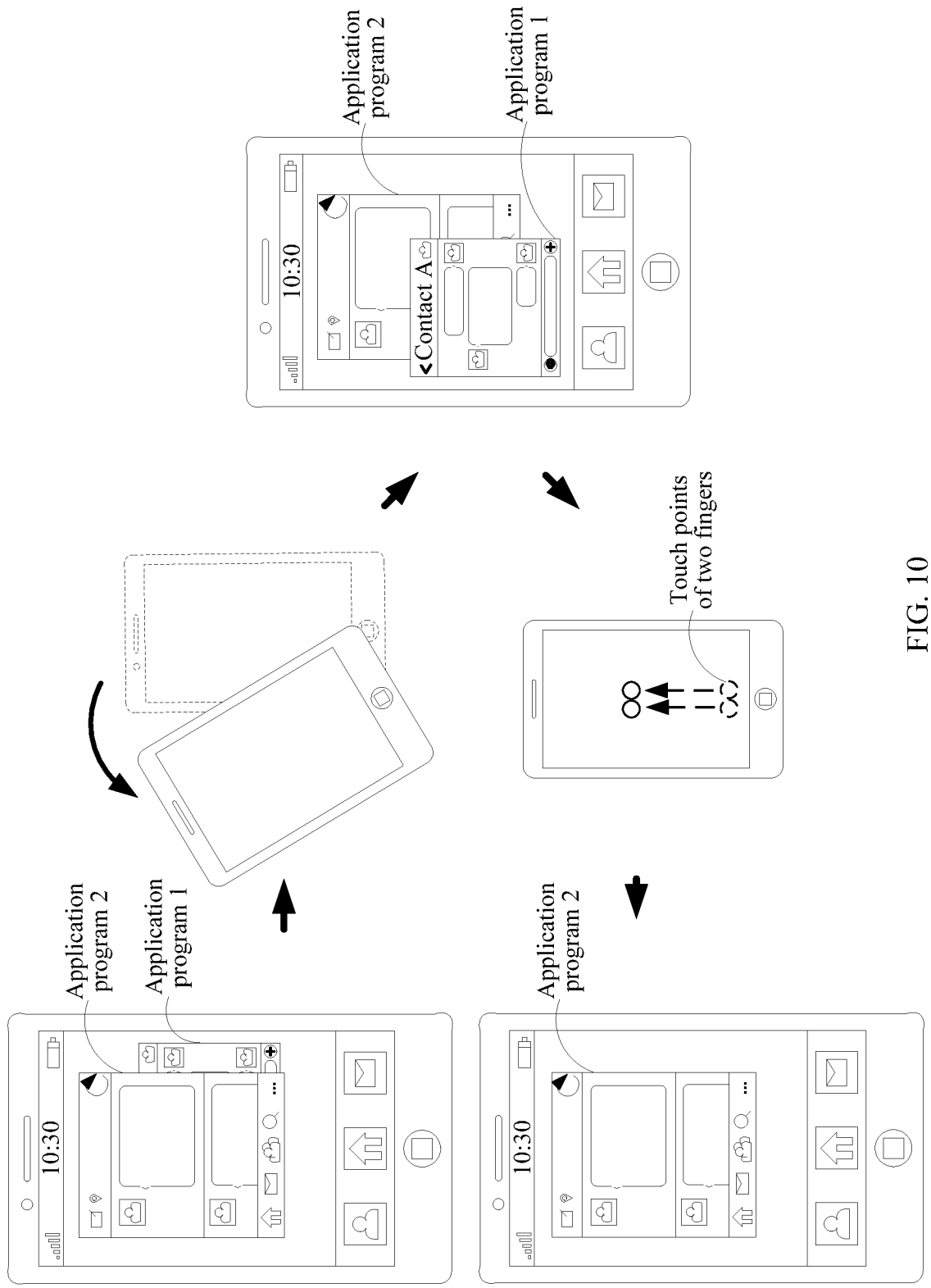
FIG. 10 is a schematic diagram 5 of an processing effect of an interaction operation according to an embodiment of the present invention.

For example, as shown in FIG. 10, as an example, an application program 1 is the target application program, and the user closing operation is a gesture that two fingers slide up (whose type is a preset restoration gesture). After the window corresponding to the target application program is adjusted according to the preset adjustment policy corresponding to the display instruction or the target application program is displayed in the preset user interface mode corresponding to the display instruction, the input module of the electronic device detects the gesture operation that two fingers slide up and that is performed by the user on the electronic device. If the processor determines that the target application program is currently not in a terminated state (that is, the target application program is not closed), a closing instruction is triggered, to close the target application program.

It should be noted that, when multiple pieces of notification information exist in the notification manager of the electronic device, the operations of steps S201 to S208 may be performed repeatedly, and the notification information is successively processed; or one or more of the operations of steps S201 to S208 are selectively repeated or continuously performed, for example, the operations of steps S201 to S207 are repeatedly performed, and the operation of step S208 is then performed repeatedly and continuously, and after multiple pieces of information are accumulated and displayed, the multiple pieces of information are closed successively. The operation steps used to process the multiple pieces of notification information are only an example. The operation steps include but are not limited to the foregoing examples. The user may perform multiple types of nesting of the operations of steps S201 to S208 according to an actual use requirement, which is not limited herein.

This embodiment of the present invention provides a method for processing notification information. After a user display operation is detected, and a display instruction corresponding to the user display operation is triggered, a target application program corresponding to notification information is determined; and when it is determined that a screen display status meets a condition, a window corresponding to the target application program is adjusted according to a preset adjustment policy corresponding to the display instruction. In this way, a display status of a target application program corresponding to notification information is adjusted according to a preset interaction operation, avoiding a problem in the prior art that starting or switching to an application according to notification information in a notification bar causes complex steps of processing the notification information and inconvenient operations. Therefore, compared with the prior art, according to the present invention, operations of processing notification information can be simplified, controllability can be improved, and user experience of a device can be improved.

Figure 11:
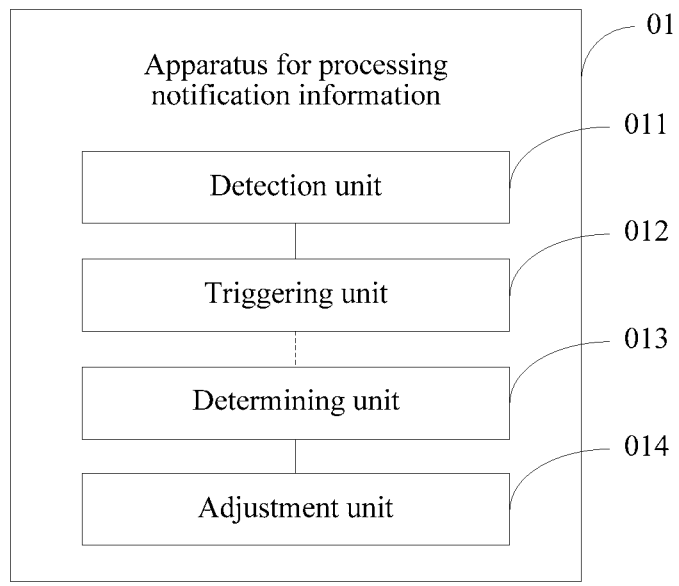
FIG. 11 is a schematic structural diagram 1 of an apparatus for processing notification information according to an embodiment of the present invention.

An embodiment of the present invention provides an apparatus 01 for processing notification information. The apparatus 01 is configured to implement a method for processing notification information provided in the embodiments of the present invention, and may be the electronic device shown in FIG. 1, or may be a function module in the device. As shown in FIG. 11, the apparatus 01 includes:

a detection unit 011, configured to detect a user display operation;

a triggering unit 012, configured to trigger a display instruction corresponding to the user display operation, where the display instruction is used to instruct to display received notification information;

a determining unit 013, configured to determine, according to an application identifier indicated by the notification information, a target application program corresponding to the notification information; and an adjustment unit 014, configured to: after it is determined that the target application program in a visible state exists on a current screen, and the target application program is in a window display mode, adjust, according to a preset adjustment policy corresponding to the display instruction, one or more of a location, a size, or a display layer of a window corresponding to the target application program.

It should be noted that a dashed line indicates that units may have a connection relationship, or may not have a direct connection relationship. For example, no information interaction may exist between the triggering unit 012 and the determining unit 013, and the triggering unit 012 may or may not notify the determining unit 013 when triggering the display instruction, which is centrally scheduled by the apparatus. A dashed box indicates that a unit may or may not exist in the apparatus, which is not limited herein.

Optionally, the user display operation detected by the detection unit 011 includes multiple different operation types, and the triggering unit 012 may be specifically configured to:

trigger, according to an operation type of the user display operation, a display instruction corresponding to the operation type.

Further, the adjustment unit 014 may be specifically configured to:

determine, according to a type of the triggered display instruction, an adjustment parameter corresponding to the display instruction, where the adjustment parameter includes target location coordinates and/or a target window size;

move the window corresponding to the target application program to the target location coordinates, and/or adjust the window corresponding to the target application program to the target window size; and when it is determined that the target application program is not an application program in a foreground of the screen, allocate a focus to the window corresponding to the target application program.

Figure 12:
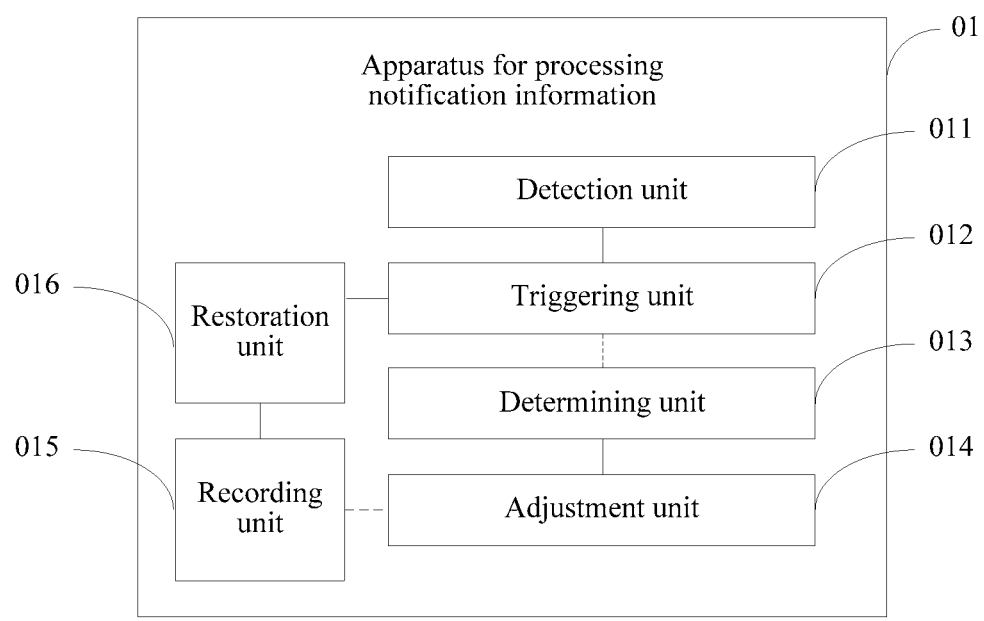
FIG. 12 is a schematic structural diagram 2 of an apparatus for processing notification information according to an embodiment of the present invention.

Optionally, as shown in FIG. 12, the apparatus 01 may further include: a recording unit 015 and a restoration unit 016, where specifically:

the recording unit 015 is configured to: before the adjustment unit 014 adjusts, according to the preset adjustment policy corresponding to the display instruction, one or more of the location, the size, or the display layer of the window corresponding to the target application program, record an initial parameter for describing a current display status of the window corresponding to the target application program, where the initial parameter includes one or more of initial location coordinates, an initial window size, or an initial display layer.

Further, the detection unit 011 may be further configured to detect a user restoration operation after the adjustment unit 014 adjusts, according to the preset adjustment policy corresponding to the display instruction, one or more of the location, the size, or the display layer of the window corresponding to the target application program.

Still further, the triggering unit 012 may be further configured to: after the detection unit 011 detects and obtains the user restoration operation, trigger a restoration instruction corresponding to the user restoration operation.

The restoration instruction is used to instruct to restore, to an initial display status, the window that corresponds to the target application program and that is adjusted according to the preset adjustment policy.

Still further, the restoration unit 016 is configured to: after the triggering unit 012 triggers the restoration instruction, adjust, according to an indication of the restoration instruction by using the initial parameter, one or more of the display location, the window size, or the display layer of the window corresponding to the target application program.

Figure 13:
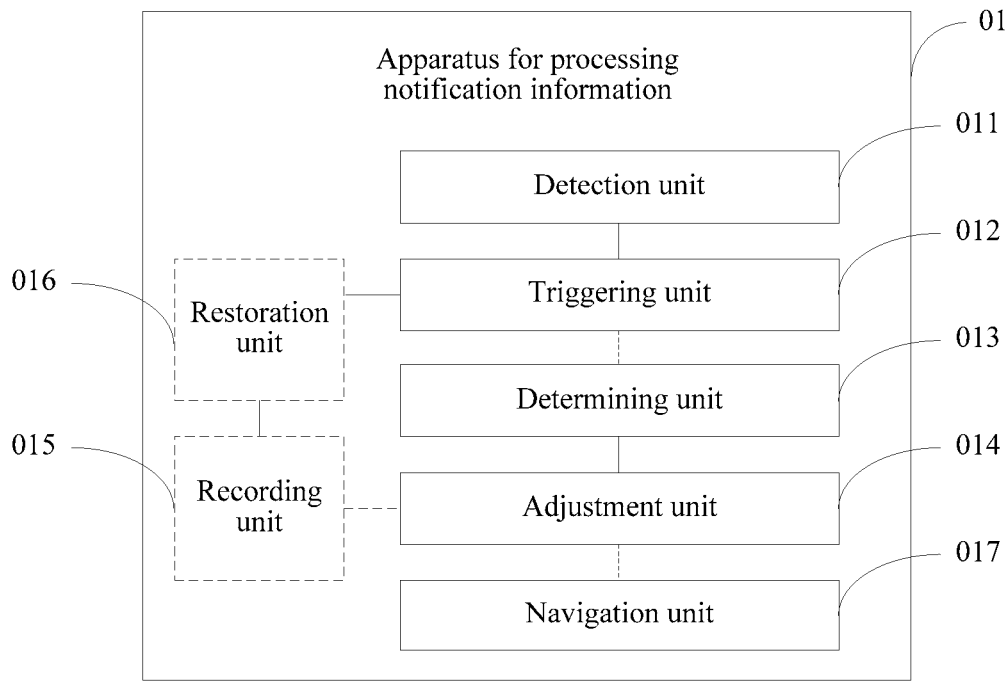
FIG. 13 is a schematic structural diagram 3 of an apparatus for processing notification information according to an embodiment of the present invention.

Optionally, as shown in FIG. 13, the apparatus 01 may further include a navigation unit 017, which may be specifically configured to:

after the adjustment unit 014 adjusts, according to the preset adjustment policy corresponding to the display instruction, one or more of the location, the size, or the display layer of the window corresponding to the target application program, determine a corresponding function module and/or message sender in the target application program according to an application module identifier and/or a sender identifier indicated by the notification information; and display the target application program as a corresponding operation screen according to the function module and/or the message sender.

Figure 14:
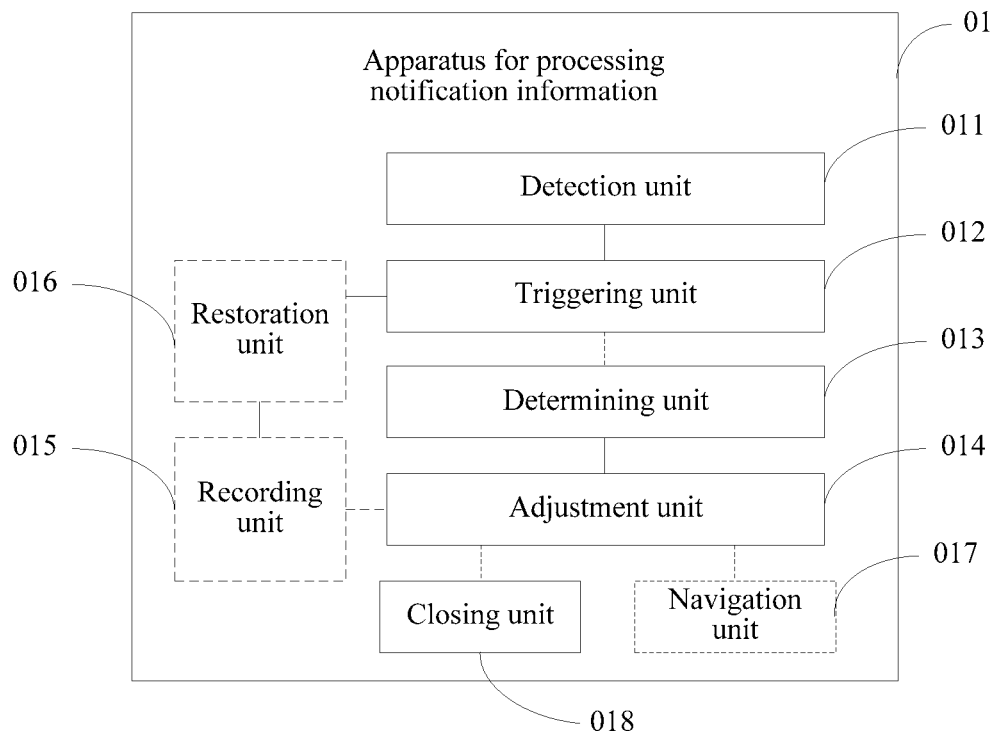
FIG. 14 is a schematic structural diagram 4 of an apparatus for processing notification information according to an embodiment of the present invention.

Optionally, as shown in FIG. 14, the apparatus 01 may further include a closing unit 018, where specifically:

the detection unit 011 may be further configured to detect a user closing operation after the adjustment unit 014 adjusts, according to the preset adjustment policy corresponding to the display instruction, one or more of the location, the size, or the display layer of the window corresponding to the target application program.

Further, the triggering unit 012 may be further configured to: after the detection unit 011 detects and obtains the user closing operation, trigger a closing instruction corresponding to the user closing operation.

The closing instruction is used to instruct to close the target application program.

Still further, the closing unit 018 is configured to close the target application program according to an indication of the closing instruction after the triggering unit 012 triggers the closing instruction, so that the target application program is invisible on the screen.

Figure 15:
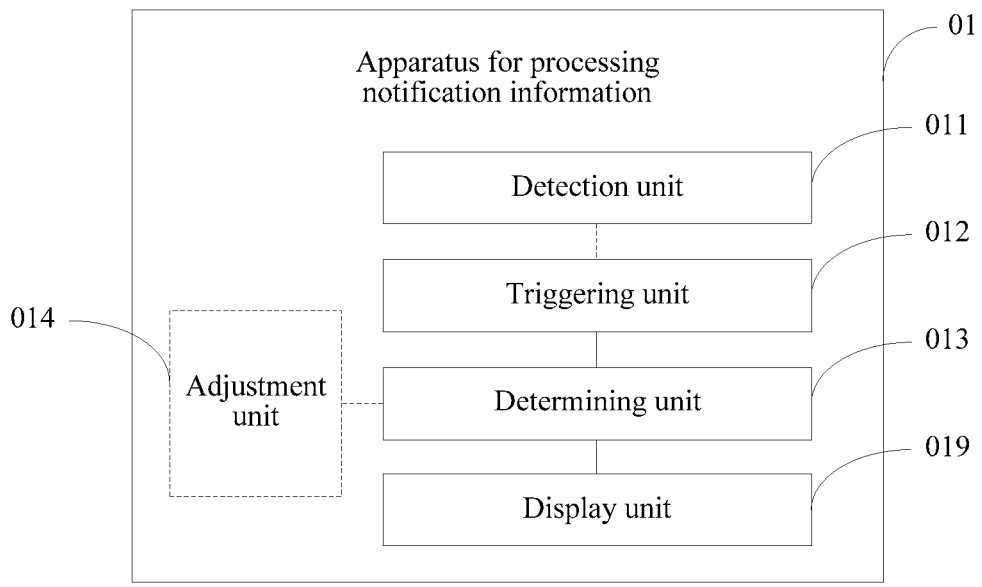
FIG. 15 is a schematic structural diagram 5 of an apparatus for processing notification information according to an embodiment of the present invention.

Optionally, as shown in FIG. 15, the apparatus 01 may further include:

a display unit 019, configured to: after it is determined that the target application program in a visible state does not exist on the current screen, display the target application program in a preset user interface mode corresponding to the display instruction.

The preset user interface mode is a full-screen display mode or a window display mode.

Further, optionally, the display unit 019 may be specifically configured to:

when it is determined that any running application program exists in a foreground of the current screen, display the target application program in the window display mode in the foreground of the screen; or when it is determined that no running application program exists in a foreground of the current screen, display the target application program in the full-screen display mode in the foreground of the screen.

Further, optionally, the user display operation detected by the detection unit 011 includes multiple different operation types, and the triggering unit 012 may be specifically configured to:

trigger, according to an operation type of the user display operation, a display instruction corresponding to the operation type.

Still further, when the preset user interface mode is the window display mode, the display unit 019 may be specifically configured to:

determine, according to a type of the triggered display instruction, a window display parameter corresponding to the display instruction, where the window display parameter includes display location coordinates and/or a display window size; and display, in the window display mode according to the window display parameter, the window corresponding to the target application program.

Figure 16:
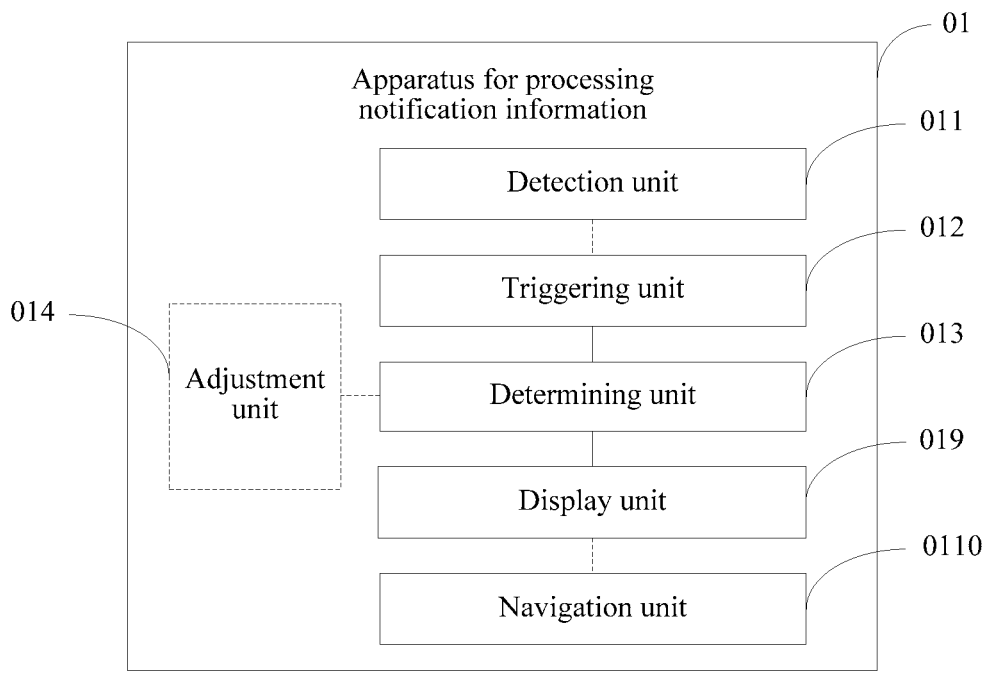
FIG. 16 is a schematic structural diagram 6 of an apparatus for processing notification information according to an embodiment of the present invention.

Further, optionally, as shown in FIG. 16, the apparatus 01 may further include a navigation unit 0110, which may be specifically configured to:

after the display unit 019 displays the target application program in the preset user interface mode corresponding to the display instruction, determine a corresponding function module and/or message sender in the target application program according to an application module identifier and/or a sender identifier indicated by the notification information; and display the target application program as a corresponding operation screen according to the function module and/or the message sender.

Figure 17:
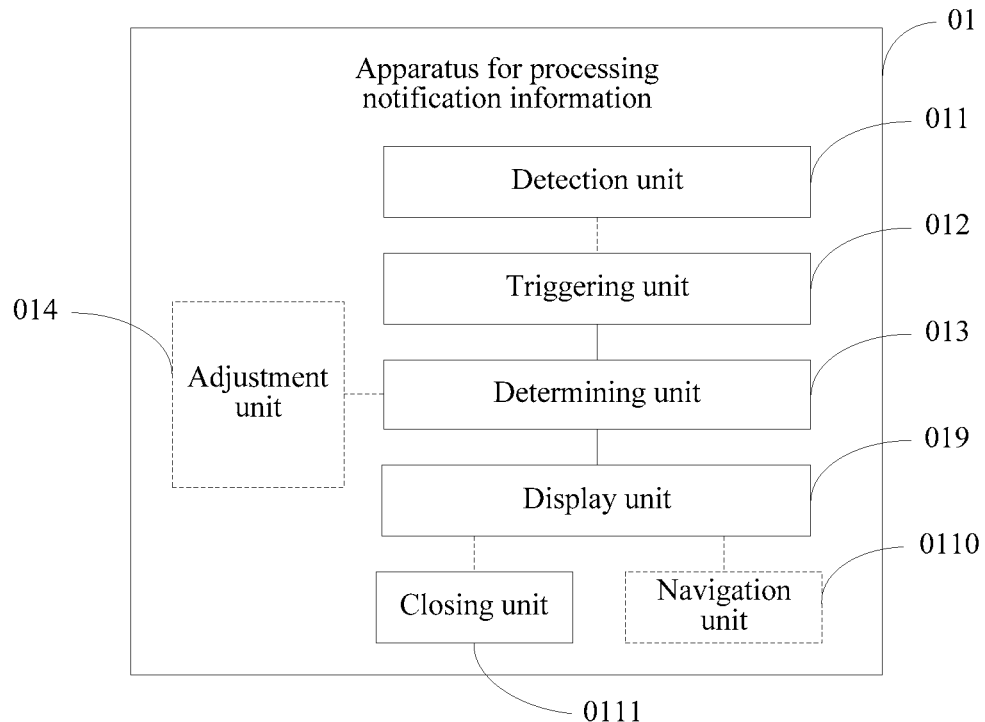
FIG. 17 is a schematic structural diagram 7 of an apparatus for processing notification information according to an embodiment of the present invention.

Further, optionally, as shown in FIG. 17, the apparatus 01 may further include a closing unit 0111, where specifically:

the detection unit 011 may be further configured to detect a user closing operation after the detection unit 019 displays the target application program in the preset user interface mode corresponding to the display instruction.

Further, the triggering unit 012 may be further configured to: after the detection unit 011 detects and obtains the user closing operation, trigger a closing instruction corresponding to the user closing operation.

The closing instruction is used to instruct to close the target application program.

Still further, the closing unit 0111 is configured to close the target application program according to an indication of the closing instruction after the triggering unit 012 triggers the closing instruction, so that the target application program is invisible on the screen.

This embodiment of the present invention provides an apparatus for processing notification information. After a user display operation is detected, and a display instruction corresponding to the user display operation is triggered, a target application program corresponding to notification information is determined; and when it is determined that a screen display status meets a condition, a window corresponding to the target application program is adjusted according to a preset adjustment policy corresponding to the display instruction. In this way, a display status of a target application program corresponding to notification information is adjusted according to a preset interaction operation, avoiding a problem that starting or switching to an application according to notification information in a notification bar causes complex steps of processing the notification information and inconvenient operations. Therefore, operations of processing notification information can be simplified, controllability can be improved, and user experience of a device can be improved.

Figure 18:
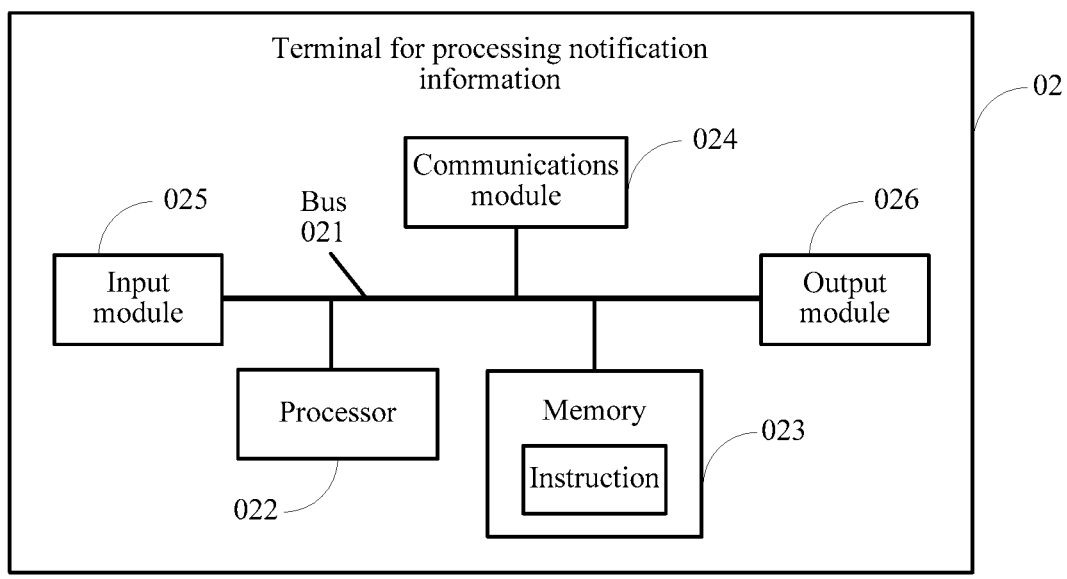
FIG. 18 is a schematic structural diagram of a terminal for processing notification information according to an embodiment of the present invention.

An embodiment of the present invention further provides a terminal 02 for processing notification information, where the terminal 02 is configured to implement a method for processing notification information provided in the embodiments of the present invention. As shown in FIG. 18, the terminal 02 for processing notification information includes:

a bus 021, and a processor 022, a memory 023, a communications module 024, an input module 025, and an output module 026 that are connected to the bus, where the communications module 024 is configured to provide a communication service to the terminal, and the input module 025 and the output module 026 are configured to interact with an external device. For a specific hardware structure of the terminal 02, refer to the electronic device in FIG. 1, and details are not described herein again.

The memory 023 is configured to store instructions, and the processor 022 executes the instructions to detect a user display operation.

The processor 022 executes the instructions to further trigger a display instruction corresponding to the user display operation, where the display instruction is used to instruct to display received notification information.

The processor 022 executes the instructions to further determine, according to an application identifier indicated by notification information, a target application program corresponding to the notification information.

The processor 022 executes the instructions to further: after it is determined that the target application program in a visible state exists on a current screen, and the target application program is in a window display mode, further adjust, according to a preset adjustment policy corresponding to the display instruction, one or more of a location, a size, or a display layer of a window corresponding to the target application program.

In this embodiment of the present invention, optionally, the user display operation includes multiple different operation types, and the processor 022 may execute the instructions to specifically:

trigger, according to an operation type of the user display operation, a display instruction corresponding to the operation type.

Further, the processor 022 may execute the instructions to further specifically:

determine, according to a type of the triggered display instruction, an adjustment parameter corresponding to the display instruction, where the adjustment parameter includes target location coordinates and/or a target window size;

move the window corresponding to the target application program to the target location coordinates, and/or adjust the window corresponding to the target application program to the target window size; and when it is determined that the target application program is not an application program in a foreground of the screen, allocate a focus to the window corresponding to the target application program.

In this embodiment of the present invention, optionally, before executing the instructions to adjust, according to the preset adjustment policy corresponding to the display instruction, one or more of the location, the size, or the display layer of the window corresponding to the target application program, the processor 022 executes the instructions to further specifically:

record an initial parameter for describing a current display status of the window corresponding to the target application program, where the initial parameter includes one or more of initial location coordinates, an initial window size, or an initial display layer; and after executing the instructions to adjust, according to the preset adjustment policy corresponding to the display instruction, one or more of the location, the size, or the display layer of the window corresponding to the target application program, the processor 022 executes the instructions to further specifically:

detect a user restoration operation;

trigger a restoration instruction corresponding to the user restoration operation, where the restoration instruction is used to instruct to restore, to an initial display status, the window that corresponds to the target application program and that is adjusted according to the preset adjustment policy; and adjust, according to an indication of the restoration instruction by using the initial parameter, one or more of the display location, the window size, or the display layer of the window corresponding to the target application program.

In this embodiment of the present invention, optionally, after executing the instructions to adjust, according to the preset adjustment policy corresponding to the display instruction, one or more of the location, the size, or the display layer of the window corresponding to the target application program, the processor 022 executes the instructions to further specifically:

determine a corresponding function module and/or message sender in the target application program according to an application module identifier and/or a sender identifier indicated by the notification information; and display the target application program as a corresponding operation screen according to the function module and/or the message sender.

In this embodiment of the present invention, optionally, after executing the instructions to adjust, according to the preset adjustment policy corresponding to the display instruction, one or more of the location, the size, or the display layer of the window corresponding to the target application program, the processor 022 executes the instructions to further specifically:

detect a user closing operation;

trigger a closing instruction corresponding to the user closing operation, where the closing instruction is used to instruct to close the target application program; and close the target application program according to an indication of the closing instruction, so that the target application program is invisible on the screen.

In this embodiment of the present invention, optionally, the processor 022 may execute the instructions to specifically:

after it is determined that the target application program in a visible state does not exist on the current screen, display the target application program in a preset user interface mode corresponding to the display instruction, where the preset user interface mode is a full-screen display mode or a window display mode.

In this embodiment of the present invention, optionally, the processor 022 may execute the instructions to specifically:

when it is determined that any running application program exists in a foreground of the current screen, display the target application program in the window display mode in the foreground of the screen; or when it is determined that no running application program exists in a foreground of the current screen, display the target application program in the full-screen display mode in the foreground of the screen.

In this embodiment of the present invention, optionally, the user display operation includes multiple different operation types, and the processor 022 may execute the instructions to specifically:

trigger, according to an operation type of the user display operation, a display instruction corresponding to the operation type; and further, the processor 022 may execute the instructions to further specifically:

determine, according to a type of the triggered display instruction, a window display parameter corresponding to the display instruction, where the window display parameter includes display location coordinates and/or a display window size; and display, in the window display mode according to the window display parameter, the window corresponding to the target application program.

In this embodiment of the present invention, optionally, after executing the instructions to display the target application program in the preset user interface mode corresponding to the display instruction, the processor 022 executes the instructions to further specifically:

determine a corresponding function module and/or message sender in the target application program according to an application module identifier and/or a sender identifier indicated by the notification information; and display the target application program as a corresponding operation screen according to the function module and/or the message sender.

In this embodiment of the present invention, optionally, after executing the instructions to display the target application program in the preset user interface mode corresponding to the display instruction, the processor 022 executes the instructions to further specifically:

detect a user closing operation;

trigger a closing instruction corresponding to the user closing operation, where the closing instruction is used to instruct to close the target application program; and close the target application program according to an indication of the closing instruction, so that the target application program is invisible on the screen.

This embodiment of the present invention provides a terminal for processing notification information. After a user display operation is detected, and a display instruction corresponding to the user display operation is triggered, a target application program corresponding to notification information is determined; and when it is determined that a screen display status meets a condition, a window corresponding to the target application program is adjusted according to a preset adjustment policy corresponding to the display instruction. In this way, a display status of a target application program corresponding to notification information is adjusted according to a preset interaction operation, avoiding a problem that starting or switching to an application according to notification information in a notification bar causes complex steps of processing the notification information and inconvenient operations. Therefore, operations of processing notification information can be simplified, controllability can be improved, and user experience of a device can be improved.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed.

In addition, functional units in the devices and the systems in the embodiments of the present invention may be integrated into one processing unit, or each of the units may exist alone physically, or two or more units are integrated into one unit. The unit may be implemented in a form of hardware, or may be implemented in a form of hardware in addition to a software functional unit.

All or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a ROM (Read Only Memory, read-only memory), a RAM (Random Access Memory, random access memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method, comprising:

displaying a first window of a first application on a screen;

receiving a message of a second application, wherein the message comprises a chat dialog, and wherein no window of the second application is visible on the screen;

displaying, on the screen, a notification corresponding to the received message, the notification being displayed in a notification bar for a preset response time, wherein each one of a plurality of different user display operations is performable with respect to the displayed notification, wherein performance of the different user display operations trigger, respectively, different preset user interface modes, wherein the preset user interface modes comprise a window display mode and a full-screen display mode; and wherein the method further includes at least one of the following:

in response to performance of a first one of the user display operations while the notification is displayed in the notification bar within the preset response time and no window of the second application is visible on the screen, displaying, on the screen, a first user interface of the second application in the window display mode and navigating to display the content of the message in the first user interface, wherein the first user interface of the second application overlaps at least part of the first window of the first application and an ongoing activity in the first window of the first application continues running without interruption when the content of the message is displayed in the window display mode; or in response to performance of a second one of the user display operations while the notification is displayed in the notification bar within the preset response time and no window of the second application is visible on the screen, displaying, on the screen, a second user interface of the second application in the full-screen display mode and navigating to display the content of the message in the second user interface.

2. The method according to claim 1, wherein the message is a short message service message, an incoming call, or a message from a social application.

3. The method according to claim 1 wherein the user display operations include different types of user display operations.

4. The method according to claim 3 wherein at least one of the user display operations is a gesture.

5. The method according to claim 1 wherein the method further comprises displaying a second interface of the second application in the window display mode, and the second interface is translucent.

6. The method according to claim 1 wherein at least one of the preset user interface modes is set by a user.

7. An electronic device comprising:

at least one processor;

a display screen; and a non-transitory computer-readable medium storing programming for execution by the at least one processor, the programming including instructions such that the at least one processor is operable to:

receive a message of a target application program;
display a notification corresponding to the received message in a notification bar for a preset response time;
detect a user display operation;
in response to detecting the user display operation within the preset response time while the target application program is currently visible on the display screen, and while an interface of the target application is currently in a window display mode, adjust a user interface corresponding to the target application program; and
in response to detecting the user display operation while the notification is displayed in the notification bar within the preset response time and the target application is currently not visible on the display screen, display a content of the message on the display screen in accordance with the detected user display operation,
wherein in response to the detected user display operation being a first type of user display operation performed within the preset response time after displaying the notification in the notification bar, the content of the message is displayed on the display screen in the window display mode, and
wherein in response to the detected user display operation being a second type of user display operation performed within the preset response time after displaying the notification in the notification bar, the content of the message is displayed on the display screen in the full-screen display mode.

8. The electronic device according to claim 7 wherein the programming further includes instructions instructing the at least one processor to:
in response to performance of the first one of the user display operations within the preset response time after displaying the notification corresponding to the received message, displaying the content of the message in the window display mode,
wherein when the content of the message is displayed in the window display mode while another application is displayed in a first window on the display screen, and an ongoing activity in the first window of the other application continues running without interruption when the content of the message is displayed in the window display mode.

9. The electronic device according to claim 7 wherein the programming further includes instructions instructing the at least one processor to:
display an interface for the target application program, wherein at least a portion of the interface is translucent.

10. The electronic device according to claim 7 wherein at least one preset user interface mode is operable to be set by a user of the device, wherein the preset user interface modes include the window display mode and the full-screen display mode.

11. The electronic device according to claim 7 wherein the instructions such that the at least one processor is operable to adjust a user interface corresponding to the target application program include instructions such that the at least one processor is operable to adjust one or more of a location, a size, or a display layer of a window corresponding to the target application program according to a display instruction of the user display operation.

12. An apparatus comprising a non-transitory computer-readable medium storing programming for execution by at least one processor, the programming including instructions that, when executed by the at least one processor, cause the at least one processor to:
after receiving a first message of a target application program, detect a first user display operation performed by a user while a window of the target application program is not visible on a display screen, wherein the first user display operation is performed within a preset response time after a notification that corresponds to the first message is displayed in a notification bar;
in response to detecting the first user display operation, display a content of the first message on the display screen in a window display mode, wherein a window for displaying the content at least partially overlaps a window of another application;
after receiving a second message of the target application program, detect a second user display operation performed by the user while the window of the target application program is not visible on the display screen, wherein the second user operation is of a type different from the first user operation, wherein the second user display operation is performed within a preset response time after a notification that corresponds to the second message is displayed in the notification bar; and
in response to detecting the second user display operation, display a content of the second message on the display screen in a full-screen display mode.

13. The apparatus according to claim 12 wherein the programming includes instructions that, when executed by the at least one processor, cause the at least one processor to:
display the notification corresponding to the first message of the target application program in the notification bar for the preset response time;
display the content of the first message on the display screen in the window display mode in response to detecting the first user display operation while the notification is displayed in the notification bar within the preset response time; and
display the content of the second message on the display screen in the full-screen display mode in response to detecting the second user display operation while the notification is displayed in the notification bar within the preset response time.

14. The apparatus according to claim 12 wherein the programming includes instructions that, when executed by the at least one processor, cause the at least one processor to:
in response to detecting a user display operation within the preset response time while the target application program is currently visible on the display screen, and while an interface of the target application program is currently in the window display mode, adjust the interface of the target application program.

15. The apparatus according to claim 12 wherein the programming includes instructions that, when executed by the at least one processor, cause the at least one processor to:
before displaying the content of the first message, display a window of a further application; and
display an interface of the target application program in a translucent state.

16. The apparatus according to claim 12 wherein the programming includes instructions that, when executed by the at least one processor, cause the at least one processor to:
before displaying the content of the first message, display a window of a further application program; and
maintain an ongoing activity in the window of the further application running continuously in an active state, while displaying the content of the first message on the display screen in the window display mode.

17. The apparatus according to claim 12 wherein the programming includes instructions that, when executed by the at least one processor, cause the at least one processor to:

in response to detecting a user restoration operation, adjust one or more parameters of the window of the target application program so as to restore the window of the target application program to an initial display status.

18. The apparatus according to claim 12 wherein the programming includes instructions that, when executed by the at least one processor, cause the at least one processor to:

after receiving a third message of the target application program, detect a third user display operation performed by the user while a window of the target application program is visible on the display screen, and adjust one or more of a location, a size, or a display layer of the window corresponding to the target application program according to a display instruction of the third user display operation.

19. The apparatus according to claim 12, the apparatus including an electronic device that includes different types of user display operations for operating notifications of the target application program.

20. The apparatus according to claim 19, wherein the user display operations comprise an operation of wobbling the electronic device side to side or an operation of wobbling the electronic device up and down.

* * * * *